United States Patent
Taylor et al.

(10) Patent No.: US 12,499,161 B2
(45) Date of Patent: *Dec. 16, 2025

(54) ASSIGNING CONTACT RECORDS TO USER ACCOUNTS

(71) Applicant: Integrity, LLC, Dallas, TX (US)

(72) Inventors: Andrew Taylor, Las Vegas, NV (US); Harsh Singla, Dallas, TX (US); Steven James Lundstrom, Elkhorn, NE (US); Rathna Pradeep Subramaniam, Irving, TX (US)

(73) Assignee: Integrity, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,337

(22) Filed: Jul. 19, 2024

(65) Prior Publication Data

US 2024/0370501 A1 Nov. 7, 2024

Related U.S. Application Data

(63) Continuation of application No. 17/902,585, filed on Sep. 2, 2022, now Pat. No. 12,045,293.

(60) Provisional application No. 63/256,892, filed on Oct. 18, 2021.

(51) Int. Cl.
*G06F 16/90* (2019.01)
*G06F 16/904* (2019.01)
*G06F 16/909* (2019.01)

(52) U.S. Cl.
CPC .......... *G06F 16/909* (2019.01); *G06F 16/904* (2019.01)

(58) Field of Classification Search
CPC ............................ G06F 16/909; G06F 16/904
See application file for complete search history.

(56) References Cited

U.S. PATENT DOCUMENTS

| | | | |
|---|---|---|---|
| 9,467,542 B1 | 10/2016 | Messenger et al. | |
| RE46,478 E | 7/2017 | Rodenbusch et al. | |
| 9,904,725 B1 * | 2/2018 | Hedges | G06F 16/955 |
| 10,650,413 B2 | 5/2020 | Black et al. | |
| 11,494,410 B2 | 11/2022 | Kuruganti et al. | |

(Continued)

FOREIGN PATENT DOCUMENTS

WO  WO 2006/023752  3/2006

OTHER PUBLICATIONS

Help.Calendly.com [online], "Assign leads to a specific Salesforce user," Jan. 20, 2022, retrieved on Jan. 4, 2023, retrieved from URL<https://help.calendly.com/hc/en-us/articles/360053862794-Assign-leads-to-a-specific-Salesforce-user#assign-leads-to-a-specific-salesforce-user-0-0>, 5 pages.

(Continued)

*Primary Examiner* — Kristopher Andersen
(74) *Attorney, Agent, or Firm* — Fish & Richardson P.C.

(57) ABSTRACT

In general, the subject matter described in this disclosure can be embodied in methods, systems, and program products. A computing system causes presentation of first and second types of contact records that are available for a user-selected geographic area, along with indications of quantities of the types of contact records. User input is received that specifies amounts of the first and second types of contact records. The computing system provides contact information for the user-specified amounts of the first and second types of contact records.

20 Claims, 27 Drawing Sheets

FIG. 11B

(56) References Cited

U.S. PATENT DOCUMENTS

| | | |
|---|---|---|
| 12,045,293 B2 | 7/2024 | Taylor et al. |
| 2004/0143473 A1 | 7/2004 | Tivey |
| 2014/0059431 A1 | 2/2014 | Svendsen et al. |
| 2014/0081688 A1 | 3/2014 | Kotak et al. |
| 2016/0371724 A1 | 12/2016 | Kulpa et al. |
| 2020/0273000 A1* | 8/2020 | Li .................. G06Q 30/02 |
| 2023/0124427 A1 | 4/2023 | Taylor et al. |

OTHER PUBLICATIONS

International Search Report and Written Opinion in International Appln. No. PCT/US2022/043795, mailed on Dec. 6, 2022, 15 pages.

Mays, [online] "Assign leads to your sales reps," Nutshell.com, Feb. 9, 2022, retrieved on Jan. 4, 2023, retrieved from URL<https://support.nutshell.com/hc/en-us/articles/115014626128-Assign-leads-to-your-sales-reps>, 8 pages.

International Preliminary Report on Patentability in International Appln. No. PCT/US2022/043795, mailed on May 2, 2024, 10 pages.

\* cited by examiner

Internet Life Lead 1 Mo — 102244
Internet Life Lead 3 Mo — 136898

Mortgage Protection w/o Image 2 Mo — 3465
Mortgage Protection without Image 3+ Mo — 16109
Mortgage Protection Call-In Silver — 3369
Aged Final Expense Mailers — 224622
Aged Mortgage Protection Mailers — 324269
Final Expense 1 Mo — 1386
Final Expense 2 Mo — 947
Final Expense 3+ Mo — 2633

FIG. 2B

| Lead Type | County | State | Quantity | Unit Cost | Coupon Discount | Total Price |
|---|---|---|---|---|---|---|
| Mortgage Protection Without Image 2 Mo | Tarrant | TX | 1 | $5.00 | $0.00 | $5.00 |
| Mortgage Protection Without Image 3 Mo | Tarrant | TX | 1 | $4.00 | $0.00 | $4.00 |
| Mortgage Protection Call-in Server | Tarrant | TX | 1 | $1.00 | $0.00 | $1.00 |
| Aged Mortgage Protection Mailers | Tarrant | TX | 1 | $2.50 | $0.00 | $2.50 |
| Instant Facebook Lead | Tarrant | TX | 1 | $20.00 | $10.00 | $10.00 |
| New Spanish Internet Lead | Tarrant | TX | 1 | $25.00 | $12.50 | $12.50 |
| New Internet Life Lead | Tarrant | TX | 1 | $9.00 | $0.00 | $9.00 |
| Internet Life Lead 1 Mo | Tarrant | TX | 1 | $4.00 | $0.00 | $4.00 |

Coupon Code: *******

Total Cost: $70.50
Total Fees: $1.43
Coupon Discount: $22.50
Order Total: $49.43

PROCEED TO PAYMENT

State
TX
Country
Tarrant
Lead Owner
SHAHRIN SHAFIQ
Phone
Received Date
10/6/2021

State
TX
Country
Tarrant
Lead Owner
SHAHRIN SHAFIQ
Phone
8175170406
Received Date
10/6/2021

State
TX
Country
Tarrant
Lead Owner
SHAHRIN SHAFIQ
Phone
8177163976
Received Date
10/6/2021

State
TX
Country
Tarrant
Lead Owner
SHAHRIN SHAFIQ
Phone
Received Date
10/6/2021

Showing 1-19 of 19

← | 1 | →    20 > per page

| First Name | Last Name | Lead Status | State | County | Lead Owner | Received Date | Phone | |
|---|---|---|---|---|---|---|---|---|
| Raul | Fonseca | L2:Second Call | AZ | Maricopa | SHAHRIN SHAFIQ | 10/6/2021 | | ↗ |
| Linda r | duncan | L2:Second Call | AZ | Maricopa | SHAHRIN SHAFIQ | 10/6/2021 | 6238249352 | ↗ |
| JOEL | BALL | L0:New | TX | Tarrant | SHAHRIN SHAFIQ | 10/6/2021 | 8173005259 | ↗ |
| Leon | jackson | L0:New | TX | Tarrant | SHAHRIN SHAFIQ | 10/6/2021 | 8178627228 | ↗ |
| Brent | Loveland | L0:New | TX | Tarrant | SHAHRIN SHAFIQ | 10/6/2021 | | ↗ |
| Shelly | | L0:New | TX | Tarrant | SHAHRIN SHAFIQ | 10/6/2021 | 8177163976 | ↗ |
| Lucy | Velasco | L0:New | TX | Tarrant | SHAHRIN SHAFIQ | 10/6/2021 | 8175170406 | ↗ |
| Karyme | Adame | L0:New | TX | Tarrant | SHAHRIN SHAFIQ | 10/6/2021 | | ↗ |
| Darren | Gipson | L0:New | TX | Tarrant | SHAHRIN SHAFIQ | 10/6/2021 | | ↗ |
| Demond | jackson | L0:New | TX | Tarrant | SHAHRIN SHAFIQ | 10/6/2021 | | ↗ |
| darrell | Wiens | L2:Second Call | AZ | Maricopa | TESTER AGENT | 10/6/2021 | | ↗ |
| testnewrecord | first name | L0:New | | | TESTER AGENT | 10/4/2021 | 8364728364 | ↗ |
| gdfhfg | nbmnbm | L0:New | TX | Nolan | TESTER AGENT | 9/30/2021 | 56465456 | ↗ |
| Melisa | Griffith | L1:First Call | TX | Nolan | TESTER AGENT | 9/29/2021 | 3252426224 | ↗ |
| Manuel | Adames | L1:First Call | TX | Nolan | TESTER AGENT | 9/29/2021 | 3252627785 | ↗ |
| Frances | Smith | L1:First Call | TX | Nolan | SHAHRIN SHAFIQ | 9/29/2021 | 4323498962 | ↗ |
| Delores | Dilday | L0:New | | Contra Costa | SHAHRIN SHAFIQ | 9/29/2021 | | ↗ |
| Mary | jennings | L0:New | TX | Nolan | SHAHRIN SHAFIQ | 9/29/2021 | 325854322 | ↗ |

Lead][CENTER

- Order Leads
- ⏱ Realtime Campaigns
- 📋 Manage Leads
- 🏷 Coupons
- 👥 Manage Agents Need Help? | 🛒 | 🔔 | FRANK SIMPSON 👤 ▸

Manage Realtime Campaigns / Create Campaign

Campaign Name

Set Campaign Details ———●——— Choose Geography ———●——— Configure Lead Volume ———●——— Finalize Campaign ✏ Product Type — 1610
Life Insurance ✏ Lead Type — 1620
Internet Lead (Unit Cost: $20.00)

✏ Lead Volume — 1630
50 Leads / Week
10 Lead Daily Cap — 1640

✏ Locations — 1650
▲ California (Selected Counties)
▲ Nevada (All Counties)
▲ Delaware (All Counties)

Cost per Lead
$20.00

Weekly Cost (********) $450.00
Service Fee (********) $13.05
Total Costs (********) $463.05

Payment Method:
[ Rarhna Test (**  ** 3265) ▾ ] Edit Payment Method

*Launching this campaign and result in an immediate hold being placed on your account equivalent to the total expected weekly cost. Choosing to proceed indicates that you accept this charge.*

1670 — ( BACK )
1680 — ( LAUNCH CAMPAIGN )

FIG. 16

ASSIGNING CONTACT RECORDS TO USER ACCOUNTS

CROSS-REFERENCE TO RELATED APPLICATIONS

This application is a continuation of U.S. patent application Ser. No. 17/902,585, filed Sep. 2, 2022, which claims the benefit of U.S. Provisional Patent Applications No. 63/256,892, filed on Oct. 18, 2021, the contents of which are hereby incorporated by reference herein in their entirety.

TECHNICAL FIELD

This document generally relates to computer systems, user interfaces, and computer-implemented methods for assigning contact records to user accounts.

BACKGROUND

Some computer application programs allow users to maintain a list of contact records. These contact records can identify information on individuals represented by the contact records, such as names, email addresses, and physical addresses. Users can interact with these application programs to create new contact records, modify contact records, and even share contact records with other users.

SUMMARY

This document describes techniques, methods, systems, and other mechanisms for assigning contact records to user accounts. In general, a computing system can store a collection of contact records that identify contact information for a variety of individuals, and can assign contact records to user accounts of users tasked with contacting the individuals. (For clarity, this disclosure refers to persons that receive access to contact records as "users" and persons that are specified in contact records as "individuals".)

The users tasked with contacting individuals may not be able to select the specific contact records assigned to such users. Still, such users may be able to submit a request for contact records and specify preferences in the request, such as a geographic area, types of contact records, and a quantity of each type of contact records. The computing system may use this information to select a group of contact records that meet the preferences specified by the requesting user, from a larger collection of contact records, and assign the selected group of contact records to the requesting user.

The computing system may also perform an automated, recurring assignment of contact records to users each recurring period of time (e.g., each week). Criteria that defines such a recurring assignment of contact records may be user specified, for example, such that a user account will receive a twenty contacts of a particular type each week.

After the computing system has assigned a selected group of contact records to a user (e.g., either as part of a one-off request, or a recurring distribution), the user may be able to view and edit each contact record (e.g., view and edit the name of and phone number of an individual specified by the contact record).

Particular implementations can, in certain instances, realize one or more of the following advantages. A computing system may distribute contact records to multiple users in an efficient manner. Information within contact records (e.g., names and/or telephone numbers) may be hidden from users until distribution, at which time such information may be revealed to the users.

Users may be able to request contact records that meet certain criteria, but may be unable to choose individual contact records. The computing system identifying the specific contact records to distribute to users can prevent users from accessing numerous contact records to find those contact records that satisfy certain criteria, saving computing resources. As such, a speed at which an individual can receive relevant contact records is increased. Moreover, such a distribution of contact records can prevent multiple different users from contacting the same individual, saving computing and telephony resources.

As additional description to the embodiments described below, the present disclosure describes the following embodiments.

Embodiment 1 a computer-implemented method, comprising: receiving, by a computing system, an indication that user input at a remote computing device selected a user-selected geographic area from a plurality of geographic areas available for selection at the remote computing device; determining, by the computing system, a subset of contact records that correspond to the user-selected geographic area from a plurality of contact records that correspond to various geographic areas; determining, by the computing system, a first quantity of contact records in the subset of contact records that are a first type of contact record; determining, by the computing system, a second quantity of contact records in the subset of contact records that are a second type of contact record; providing, by the computing system, information to cause the remote computing device to present: (i) an indication that the first type of contact record is available for the user-selected geographic area, an indication of the first quantity of contact records in the subset of contact records that are the first type, and a first selectable interface element that enables user input to select an amount of the first quantity of contact records, without the remote computing device presenting contact information for any contact record that is of the first type from the plurality of contact records; (ii) an indication that the second type of contact record is available for the user-selected geographic area, an indication of the second quantity of contact records in the subset of contact records that are the second type, and a second selectable interface element that enables user input to select an amount of the second quantity of contact records, without the remote computing device presenting contact information for any contact record that is of the second type from the plurality of contact records; receiving, by the computing system, an indication that user input at the remote computing device: (i) interacted with the first selectable interface element to specify a first user-specified amount of contact records of the first type; and (ii) interacted with the second selectable interface element to specify a second user-specified amount of contact records of the second type; and providing, by the computing system responsive to receiving the indication that user input interacted with the first selectable interface element and the second selectable interface element, information to cause the remote computing device to present: (i) contact information for each contact record in a first group of contact records that are the first type, that are of a quantity that matches the first user-specified amount, and that are from the plurality of contact records; and (ii) contact information for each contact record in a second group of contact records that are the second type, that are of a quantity that matches the second user-specified amount, and that are from the plurality of contact records.

Embodiment 2 is the computer-implemented method of embodiment 1, wherein: the plurality of contact records represent contact records that are unassigned to a user account of a contacting individual; and the method comprises, responsive to the computing system receiving the indication that user input at the remote computing device interacted with the first selectable interface element and the second selectable interface element: assigning the first group of contact records and the second group of contact records to a user account that is logged into the remote computing device, and removing the first group of contact records and the second group of contact records from the plurality of contact records.

Embodiment 3 is the computer-implemented method of any one of embodiments 1-2, wherein: the first user-specified amount of contact records of the first type is greater than one contact record of the first type and less than the first quantity of contact records of first type; the second user-specified amount of contact records of the second type is greater than one contact record of the second type and less than the second quantity of contact records of second type; and the first user-specified amount of contact records of the first type is different from the second user-specified amount of contact records of the second type.

Embodiment 4 is the computer-implemented method of embodiment 3, comprising: randomly selecting, by the computing system, the first group of contact records from the contact records in the subset of contact records that are the first type; and randomly selecting, by the computing system, the second group of contact records from the contact records in the subset of contact records that are the second type.

Embodiment 5 is the computer-implemented method of embodiment 3, wherein: the user input that interacted with the first selectable interface element to specify the first user-specified amount includes a single user actuation with a computerized input device.

Embodiment 6 is the computer-implemented method of any one of embodiments 3-4, wherein: the first group of contact records are selected by the computing system from the plurality of contact records that are of the first type without any user interaction indicating which contact records of the first type are to be part of the first group; and the second group of contact records are selected by the computing system from the plurality of contact records that are of the second type without any user interaction indicating which contact records of the second type are to be part of the second group.

Embodiment 7 is the computer-implemented method of any one of embodiments 1-6, wherein there the computing system has access to no contact record that of both the first type and the second type.

Embodiment 8 is the computer-implemented method of any one of embodiments 1-7, wherein the remote computing device concurrently presents: (i) the indication that the first type of contact record is available for the user-selected geographic area, the indication of the first quantity of contact records in the subset of contact records that are the first type, and the first selectable interface element that enables user input to select an amount of the first quantity of contact records; and (ii) the indication that the second type of contact record is available for the user-selected geographic area, the indication of the second quantity of contact records in the subset of contact records that are the second type, and the second selectable interface element that enables user input to select an amount of the second quantity of contact records.

Embodiment 9 is the computer-implemented method of any one of embodiments 1-8, comprising: providing, by the computing system, information to cause the remote computing device to present a map that: graphically illustrates multiple distinct regions, is configured to receive user input that interacts with the map to select a particular region of the multiple distinct regions, and graphically changes in response to receiving the user input that selects the particular region to graphically illustrate multiple sub-regions of the particular region that were not graphically illustrated prior to receiving the user input that selects the particular region, wherein the user input at the remote computing device that selected the user-selected geographic area comprises user input that interacted with the map to select a particular sub-region of the multiple sub-regions after having provided user input that selected the particular region.

Embodiment 10 is the computer-implemented method of any one of embodiments 1-9, wherein the remote computing device is configured to present the map such that: user input that hovers over particular sub-region causes the remote computing device to (i) change an appearance of the particular sub-region from a first state to a second state, and (ii) present a name of the particular sub-region; and user input that selects the particular sub-region causes the remote computing device to change the appearance of the particular sub region from the second state to a third state.

Embodiment 11 is the computer-implemented method of any one of embodiments 1-10, comprising: receiving, by the computing system, an indication that user input interacted with a web page to provide a user-provided telephone number and indicate a desire to be contacted at the user-provided telephone number; and creating, by the computing system, a contact record that includes the user-provided telephone number, and adding the contact record that includes the user-provided telephone number to the plurality of contact records.

Embodiment 12 is the computer-implemented method of any one of embodiments 1-11, wherein: the contact information presented for each contact record in the first group of contact records includes a telephone number identified by the respective contact record; and the contact information presented for each contact record in the second group of contact records includes a telephone number identified by the respective contact record.

Embodiment 13 is the computer-implemented method of embodiment 12, comprising: receiving, by the computing system, an indication that user input interacted with a particular contact record from the first group of contact records to select a reminder date; and determining, by the computing system, that a current date matches the reminder date, and in response providing information to cause the remote computing device to visually present a notification to contact the particular contact record.

Embodiment 14 is the computer-implemented method of any one of embodiments 1-13, wherein: each contact record that is the first type in the subset of contact records is assigned a first value; each contact record that is the second type in the subset of contact records is assigned a second value; and the first value is different from the second value.

Embodiment 15 is the computer-implemented method of embodiment 14, comprising: receiving, by the computing system, an indication that user input provided by an administrator user account specified: (i) a user-specified first reduction in value to the first value, (ii) a user-specified code to receive the first reduction in value to the first value, and (iii) a user selection between the first reduction in value being automatically applied and the first reduction in value requiring user entry of the user-specified code, for a user account requesting access to contact information for a contact record of the first type.

Embodiment 16 is the computer-implemented method of embodiment 15, wherein: the remote computing device does not provide user access to contact information for any contact record that is of the first type from the plurality of contact records before the user input has interacted with the first selectable interface element to specify the first user-specified amount of contact records of the first type; and the remote computing device does not provide user access to contact information for any contact record that is of the second type from the plurality of contact records before the user input has interacted with the second selectable interface element to specify the second user-specified amount of contact records of the second type.

Embodiment 17 is a computing system, comprising one or more processors; and one or more computer-readable devices including instructions stored thereon that, when executed by the one or more processors cause performance of operations that perform the method of any one of embodiments 1-16.

Embodiment 18 is a computer-implemented method, comprising: defining, by a computing system, criteria to select a recurring group of contact records for distribution to a particular user account during each recurring period of time, including by: receiving, by the computing system, an indication that first user input at a remote computing device selected the recurring group of contact records to have a user-selected amount of contact records; receiving, by the computing system, an indication that second user input at the remote computing device selected the recurring group of contact records to be formed of contact records of a user-selected type of contact record from among a plurality of types of contact records; and receiving, by the computing system, an indication that third user input at the remote computing device selected the recurring group of contact records be formed of contact records that designate one or more user-selected geographic areas from among a plurality of geographic areas; selecting, by the computing system for distribution to the particular user account during a first instance of the recurring period of time, a first selected group of contact records from among a collection of contact records as the recurring group of contact records for the first instance of the recurring period of time, based on the first selected group of contact records having a quantity that matches the user-selected amount of contact records, being formed of contact records of the user-selected type of contact record, and being formed of contact records that designate at least one geographic area from the one or more user-selected geographic areas; providing, by the computing system during the first instance of the recurring period of time, first information to cause a computing device at which the particular user account has logged in to present each contact record in the first selected group of contact records; selecting, by the computing system for distribution to the particular user account during a second instance of the recurring period of time, a second selected group of contact records from among the collection of contact records as the recurring group of contact records for the second instance of the recurring period of time, based on the second selected group of contact records having the quantity that matches the user-selected amount of contact records, being formed of contact records of the user-selected type of contact record, and being formed of contact records that designate at least one geographic area from the one or more user-selected geographic areas, the second selected group of contact records being different from the first selected group of contact records; and providing, by the computing system during the second instance of the recurring period of time, second information to cause the computing device at which the particular user account has logged in to present each contact record in the second selected group of contact records.

Embodiment 19 is the computer-implemented method of embodiment 18, wherein: the second user input at the remote computing device selected the user-selected type of contact record from among the plurality of types of contact records by selecting the user-selected type of contact record from a pull-down menu that presents the plurality of types of contact records.

Embodiment 20 is the computer-implemented method of any one of embodiments 18-19, wherein: the third user input at the remote computing device selected the one or more user-selected geographic areas from among the plurality of geographic areas by interacting with a map presented by the remote computing device to select the one or more user-selected geographic areas.

Embodiment 21 is the computer-implemented method of any one of embodiments 18-20, wherein defining the criteria to select the recurring group of contact records, includes by: receiving, by the computing system, an indication that fourth user input at the remote computing device selected the recurring group of contact records to be distributed to the particular user account from among a plurality of user accounts available for selection at the remote computing device.

Embodiment 22 is the computer-implemented method of any one of embodiments 18-21, wherein: the one or more user-selected geographic areas selected by the third user input from among the plurality of geographic areas includes a first user-selected geographic area and a second user-selected geographic area; selecting the first selected group of contact records includes selecting, as portions of the first selected group of contact records: (i) a first portion of contact records that designate the first user-selected geographic area, and (ii) a second portion of contact records that designate the second user-selected geographic area; and selecting the second selected group of contact records includes selecting, as portions of the second selected group of contact records: (i) a third portion of contact records that designate the first user-selected geographic area, and (ii) a fourth portion of contact records that designate the second user-selected geographic area.

Embodiment 23 is the computer-implemented method of any one of embodiments 18-22, wherein: the first instance of the recurring period of time is a first week of time; and the second instance of the recurring period of time is a second week of time that follows the first week of time.

Embodiment 24 is the computer-implemented method of any one of embodiments 18-23, wherein: the computing system selects the first selected group of contact records during the first instance of the recurring period of time; and the computing system selects the second selected group of contact records during the second instance of the recurring period of time.

Embodiment 25 is the computer-implemented method of any one of embodiments 18-24, wherein the computing system selects the first selected group of contact records and selects the second selected group of contact records without receipt of user input that re-specifies (i) the user-selected amount of contact records, (ii) the user-selected type of contact record, and (iii) the one or more user-selected geographic areas.

Embodiment 26 is the computer-implemented method of any one of embodiments 18-25, wherein the collection of contact records from which the second selected group of contact records is selected is different from the collection of contact records from which the first selected group of contact records is selected, due to a composition of the collection of contact records changing over time due to contact records from the collection of contact records being distributed to various user accounts and new contact records being added to the collection of contact records.

Embodiment 27 is the computer-implemented method of any one of embodiments 18-26, wherein the computing device at which the particular user account logged in and that presented the first selected group of contact records and the second selected group of contact records is the remote computing device at which the criteria was defined.

Embodiment 28 is the computer-implemented method of any one of embodiments 18-27, wherein: wherein defining the criteria to select the recurring group of contact records, includes by: receiving, by the computing system, an indication that fourth user input at the remote computing device selected a user-selected maximum daily amount of contact records to distribute to the particular user account each day during the recurring period of time, wherein: the user-selected amount of contact records is greater than the user-selected maximum daily amount of contact records; providing the first information to cause the computing device to present each contact record in the first selected group of contact records includes presenting no more than a number of contact records that matches the user-selected maximum daily amount of contact records each day during the first instance of the recurring period of time; and providing the second information to cause the computing device to present each contact record in the second selected group of contact records includes presenting no more than the number of contact records that matches the user-selected maximum daily amount of contact records each day during the second instance of the recurring period of time.

Embodiment 29 is a computing system, comprising one or more processors; and one or more computer-readable devices including instructions stored thereon that, when executed by the one or more processors cause performance of operations that perform the method of any one of embodiments 18-28.

The details of one or more implementations are set forth in the accompanying drawings and the description below. Other features, objects, and advantages will be apparent from the description and drawings, and from the claims.

DESCRIPTION OF DRAWINGS

FIGS. 2A-10 show various different user interface screens used to request and manage contact records.

Figure 12:
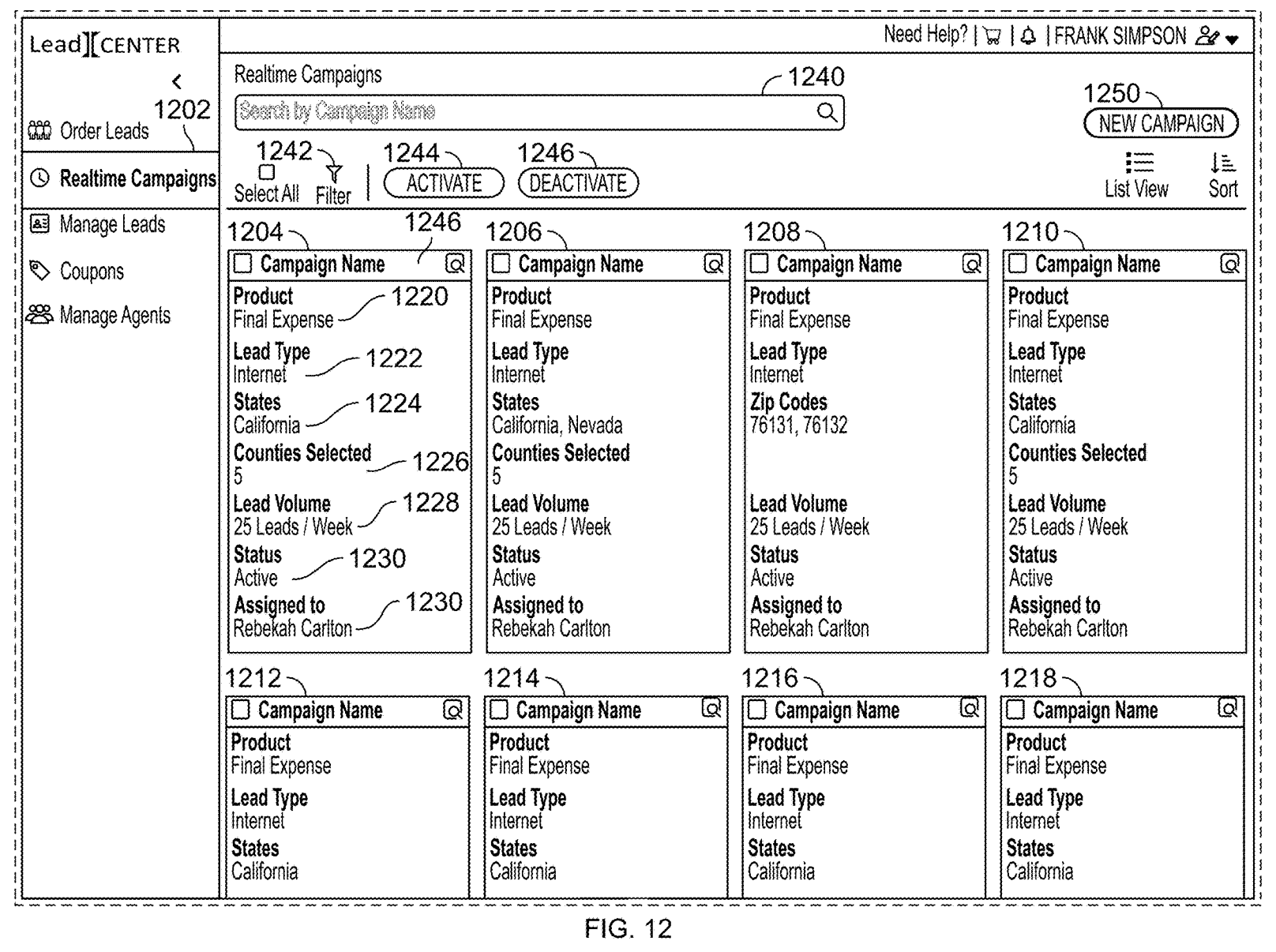

FIGS. 12-16 show various different user interface screens used to define a recurring distribution of contact records.

Like reference symbols in the various drawings indicate like elements.

DETAILED DESCRIPTION

This document generally describes mechanisms for a computing system to assign contact records to one or more user accounts. For example, the computing system may store a collection of contact records and include mechanisms for assigning these contact records to various different users so that the different users can contact individuals identified in the contact records (e.g., the users can call phone numbers specified in the contact records).

The computing system employs a unique mechanism to assign the contact records. Users are not able to view contact information from the records or select specific contact records be transferred to them. Rather, a user is able to specify a certain category of contact records in which the user is interested, along with a desired quantity of contact records from that category. The computing system then selects the user-desired quantity of contact records from that category (e.g., randomly selects or selects using metrics that the requesting user is unable to control), and then assigns the system-selected contact records to the requesting user.

Once the system-selected contact records have been assigned to the requesting user, the user is able to access certain contact information specified in each of the newly-assigned contact records for the first time, such as the names and phone numbers of individuals represented by the contact records.

System Overview

Figure 1:
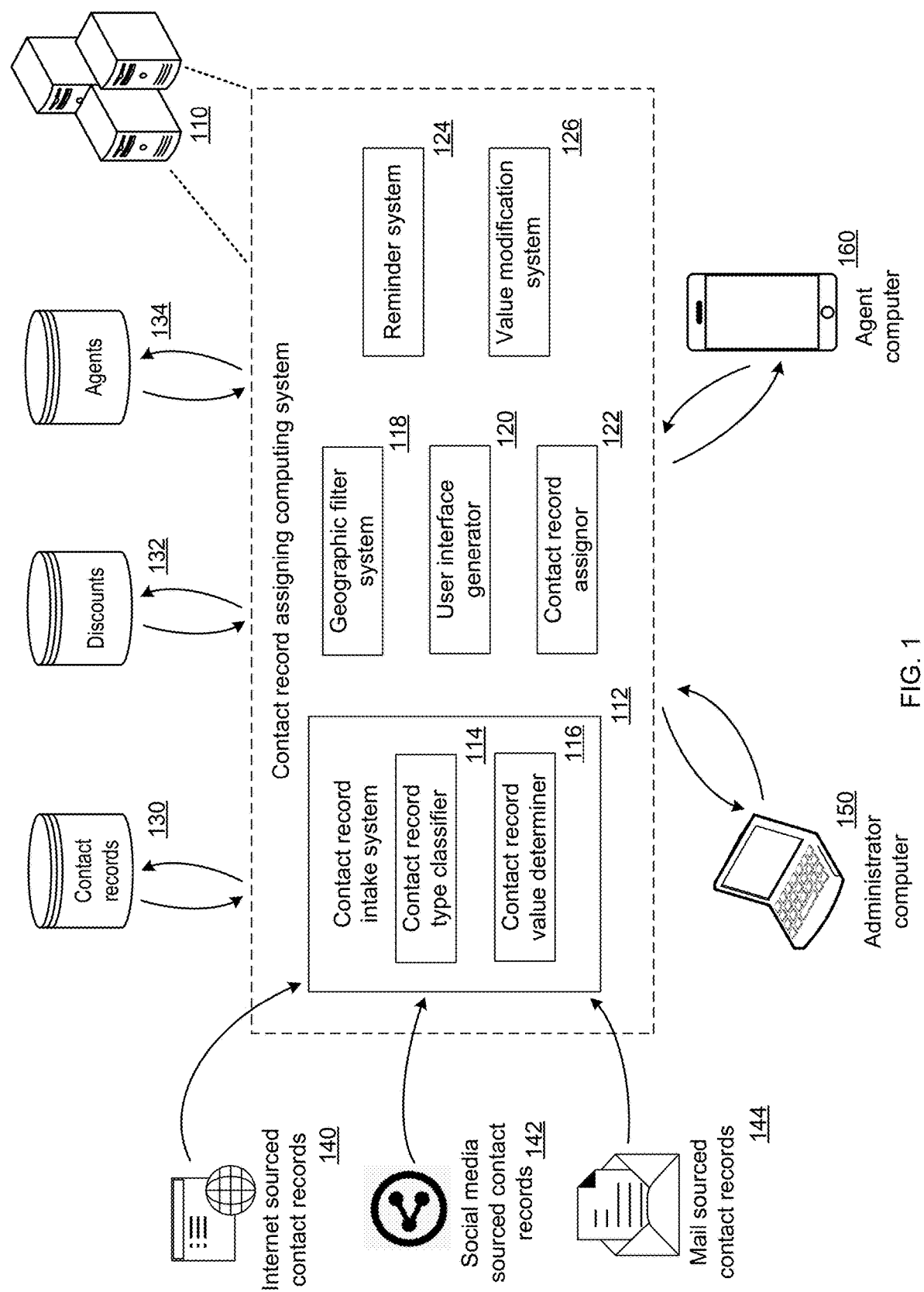
FIG. 1 shows a system that includes various components for assigning contact records to different users.

FIG. 1 shows a system that includes components for assigning contact records to various different users. A primary component of the system is the contact record assigning computing system 110, which is formed of one or more computers that execute various programs to assign contact records to users.

An origin of the information in contact records may be provided via the internet 140, social media 142, and/or physical mail 144. For instance, an individual that is using that individual's own computer to browse the internet may visit a website of a particular company, realize that the individual is interested in a product or service offered by the company, and fill out a web-based form provided by the website to request further information on the product or service offered by the company.

Another individual may that is browsing social media (e.g., using that individual's phone) may similarly express interest in the particular company, and express that interest via user interaction with certain interface elements provided by the social media site. For example, the user may select a "Follow" button to follow the particular company or may fill out a form requesting additional information related to the company.

Yet another individual may submit a mailing to the company that expresses interest in the company. The mailing may be in response to physical materials that the company physically mailed to the individual or that the individual otherwise physically received (e.g., via a flyer contained within the pages of a magazine).

The information submitted by all such individuals may be provided to the contact record intake system 112. In the case of information provided via the internet 140 or social media 142, the information may automatically route to the contact record intake system 112. In the case of information provided via physical mail 144, an employee or contactor of the company may receive the mail and physically enter the information provided by the main into the contact record intake system.

The contact record intake system 112 forms contact records from the received information. For example, the information that individuals provide may include at least names of individuals and corresponding telephone numbers. The contact record intake system 112 may form a contact record for each information submission.

A contact record type classifier 114 may then classify each contact record as being of a certain type (e.g., internet sourced and Spanish speaking, direct mail sourced and interested in "Life" products, or social media sourced from the FACEBOOK platform). The system may be configured so that each contact record is classified as a single type, and no contact record has multiple types. The contact record type classifier 114 may also label each contact record with one or more geographic regions, based on individual-specified physical mailing addresses.

A contact record value determiner 116 may then determine a value for each contact record. In some examples, the value for each contact record may be specific to and defined by the type of each contact record, with the value for each type specified by an administrator user account accessing the contact record assigning computing system 110 via an administrator computer 150. In some examples, each contact record of a certain type has the same value, and the computing system automatically modifies a value of contact records of the type based on a quantity of contact records of each type (e.g., the value of contact records may decrease the greater number unassigned contact records of the type).

A contact records datastore 130 may store the contact records. Each contact record in the datastore 130 may include demographic information specific to the individual (e.g., a name of an individual represented by the contact record and a telephone number of the individual), a type of the contact record, a value of the contact record, and an indication whether the contact record is unassigned.

The user interface generator 120 may provide information to each of multiple agent computers 160 to cause the different computers 160 to generate user interfaces that that enable agent users to request contact records and then view the contact records once assigned. Information identifying each agent user is stored in the agents datastore 134.

In order to request access to contact records not currently assigned to a user, a user may interact with a user interface to specify one or more geographic regions. In response, the geographic filter system 118 may identify a subset of contact records in the contact record datastore 118 that are associated with the specified geographic region. The user interface may then update to indicate the different types of contact records available for the specified geographic region, a value of each contact record of a given type, and a quantity of each different type that is available for the specified geographic region. The user may interact with the user interface to request access to a certain amount of contact records (e.g., 7 of the 12 available for a user-specified geographic region). In response, the contact record assignor 122 may identify a group of contact records to assign to the requesting user, and assign those contact records to the user.

A user of an agent computer 160 may view and edit the content of contact records assigned to the user. For example, the user may access a contact record to identify a phone number of an individual represented by the contact record, call the individual, learn additional information about the individual (e.g., an email address, a profession), and enter such information into the contact record.

A user can also interact with the presentation of a contact record to set a reminder to contact the individual specified in the contact record. For example, a reminder system 124 can monitor a current date to determine if the current date matches a date specified by the reminder, and can send a notification to the user upon a current date matching the date specified by the reminder.

Each contact record that is unassigned may have a value that the requesting user must provide in order to receive access to the contact record (e.g., a certain dollar amount). The discounts datastore 132 may include information that specifies a discount for certain types of data records. A value modification system 126 may access the discounts datastore 132 to determine whether the user is entitled to a discount on any contact records requested by the user, and may apply any such discount to the value of qualifying contact record types.

An administrator may use the administrator computer 150 to modify settings of the contact record assigning computing system 110. For example, the administrator may add and remove agents, information of which is stored in the agents datastore 134. The administrator may also create and modify the discounts that are stored in the discounts datastore 132.
User Interface Screens for Assigning Contact Records to User Accounts FIGS. 2-10 show various different user interface screens that provide users with the ability to request and manage contact records. These different user interface screens are presented by a user computer (e.g., the administrator computer 150 and/or the agent computer 160). The content of these different user interface screens is specified by the user interface generator 120.

Figure 2A:
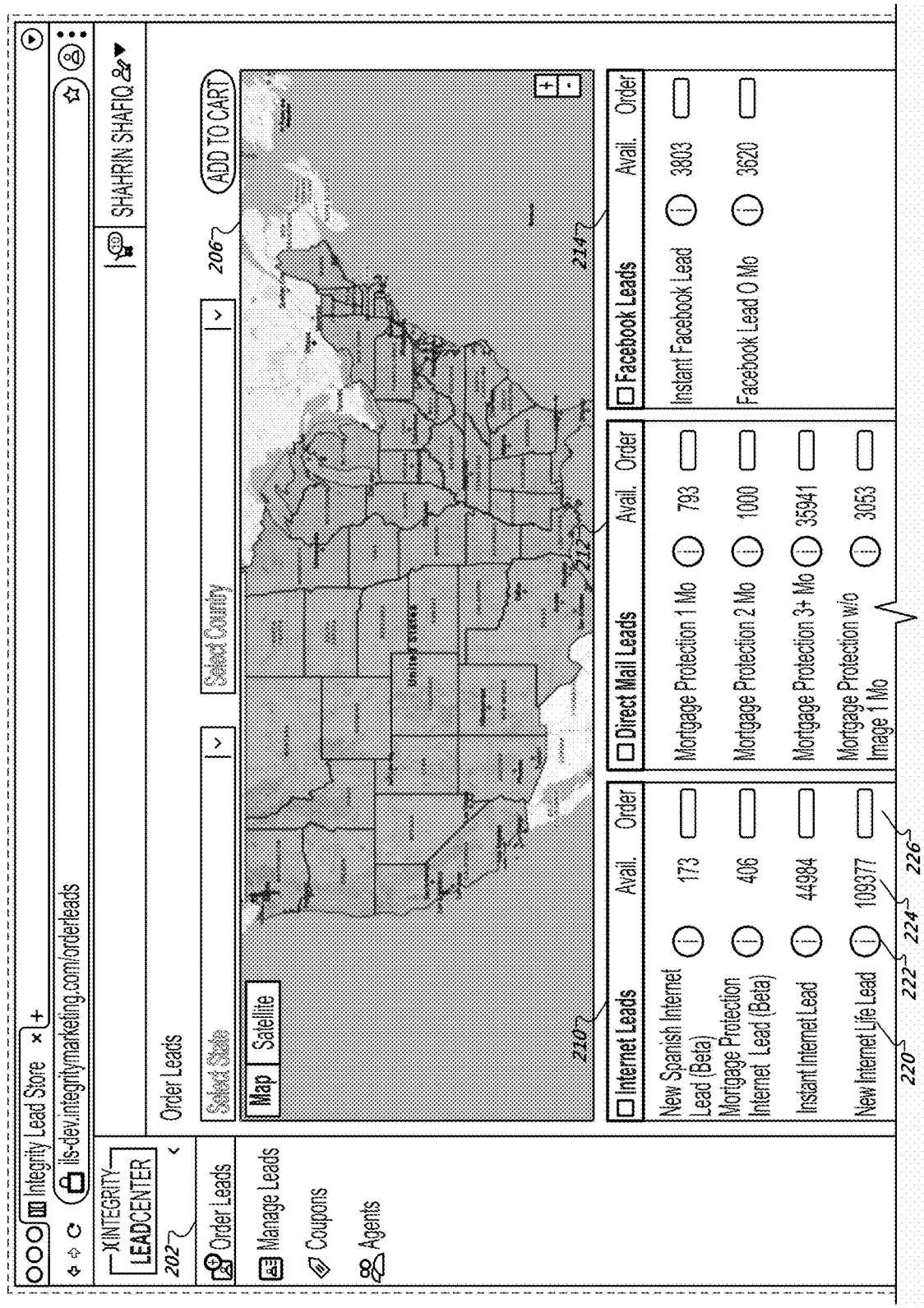

FIGS. 2A-B show a user interface screen for requesting contact records. In particular, this user interface screen shows an "Order" screen of a website that enables users to request and manage contact records. A user at user computer 160 may be a registered agent with a company that operates the contact record assigning computing system 110, and this user may access the contact record assigning computing system 110 by providing appropriate login credentials (e.g., a username and password). In response, the user may be shown the FIGS. 2A-B user interface screen, or may be shown a different introductory screen, and may navigate to the screen shown in FIGS. 2A-B through selection of the "Order" tab 202. (The figures refer to contact records as "leads", and the terms "contact record" and "lead" may be used interchangeably within this disclosure.)

A top portion of the FIGS. 2A-B screen includes an interactive map 206. The map in FIGS. 2A-B shows the United States, and graphically illustrates multiple geographic regions therein (states in this example). User input is able to interact with the display of the map, for example to zoom in and zoom out and pan from side to side. Each geographic region is surrounded by a border, and the user interface changes the displayed representation of each geographic region upon user interaction therewith. For example, should a user move a mouse over a certain geographic region, the user interface updates to shade the geographic region currently in focus with a different color.

A bottom portion of the FIGS. 2A-B screen lists three categories 210, 212, 214 of different types of unassigned contact records. For each type of contact record, the user interface screen indicates: (1) a text name 220 of the type of contact record; (2) an available quantity 224 of unassigned contact records of the type, and (3) an input field 226 with which user input may interact to request any amount of the available quantity of unassigned contact records. There is also an additional information element 222 presented for each type of contact record, which when selected results in the user interface presenting a pop-up dialog box that presents (1) a value of each contact record of the type and (2) text content that describes characteristics that result in a contact record having the corresponding type.

A first category of contact records is the "Internet" category 210, which lists six different types of available contact records of within the Internet category: a New Spanish Internet type of contact record, a Mortgage Protection Internet type of contact record, an Instant Internet type of contact record, a New Internal Life type of contact record, an Internet Life Lead 1 Mo type of contact record, and an Internet Life Lead 3M type of contact record.

These are unassigned contact records that the intake system 112 received from a non-social media internet source 140. Example internet sources 140 include web forms that individuals interested in a particular product/service can fill out, responsive to having selected an advertisement for such a product/service or visiting a website of a manufacturer or seller of the product/service. The types of the contact records indicate characteristics of the contact records, for example, based on an origin of the contact record or content provided by an individual when filling out a web-based form. For example, if the contact information was entered recently in Spanish, the created contact record may be given the "New Spanish Internet" type. If the individual that provided the contact information to form the contact record indicated an interest in a "Life" product, and the contact record has remained unassigned for multiple months, the contact record may be of the Internet Life 3 Mo" type.

A second category of contact records is the "Direct Mail" category 212, which lists twelve different types of available contact records. A third category of contact records is the "Social Media" category 214, which lists two different types of available contact records. The available quantity 224 listed for each contact record type represents the total quantity available for each type of contact record across the entire country, since user input in FIGS. 2A-B has not yet selected a geographic region.

User input can select a geographic region, for example, by clicking with a mouse or tapping with a finger on a touch-screen at a location at which the selected geographic region is displayed. In response, the computing device presenting the user interface (e.g., device 160) changes the user interface to add additional detail within the selected geographic region. The additional detail includes boundaries that depict the boundaries of sub-regions within the selected region. Such additional details may not be concurrently displayed for any non-selected region.

Should user input move a mouse cursor over a sub-region to provide focus to the sub-region, the user interface changes to modify a color of the sub region from a first color/shading to a second color/shading and to add text that indicates a name of the sub-region near a presentation of the sub-region. User input can then select the sub-region, for example, by clicking or tapping on the sub-region. In response, the user interface may further modify the sub-region from having the second color/shading to having a third color/shading.

Figure 3:
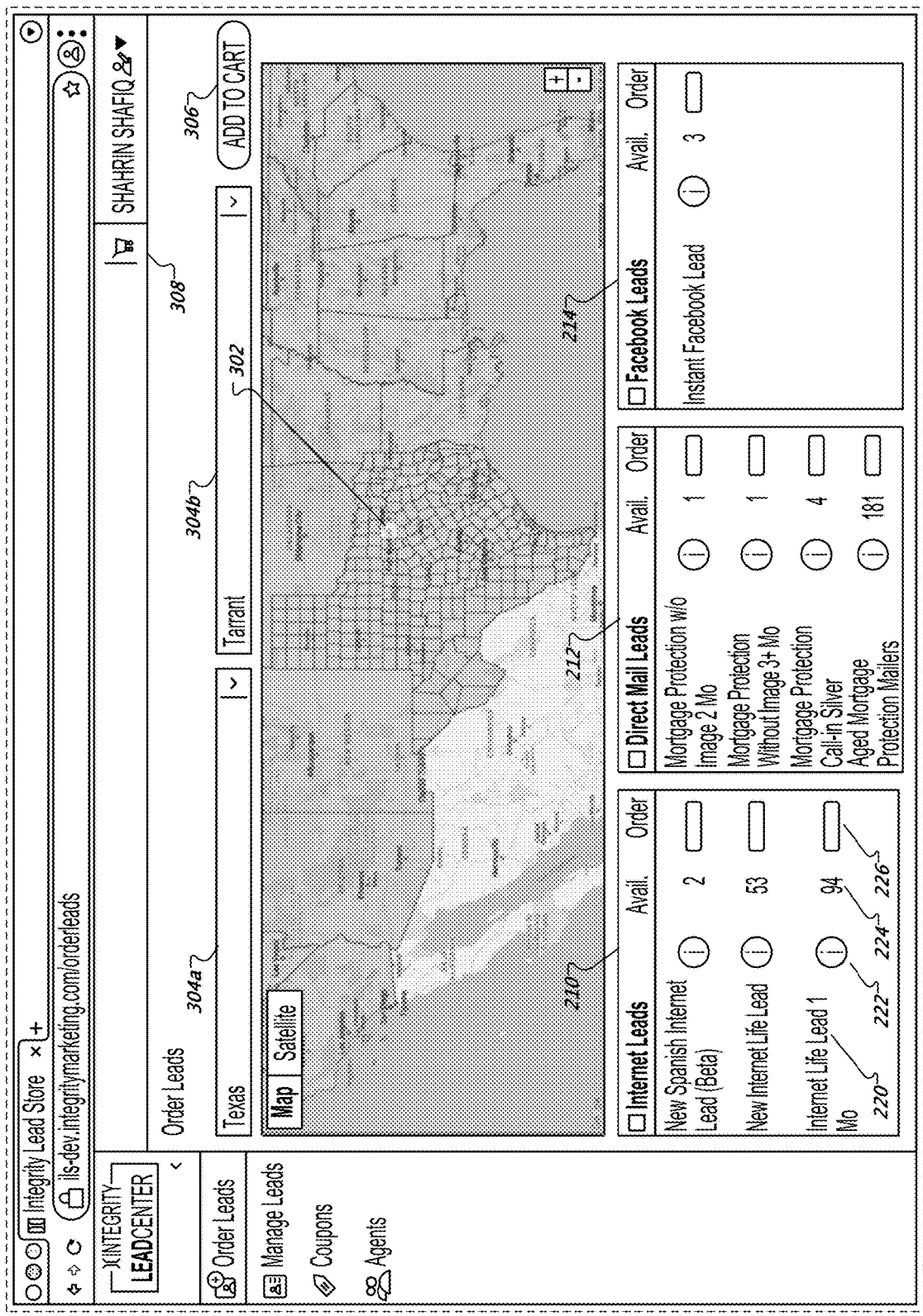
Figure 11A:
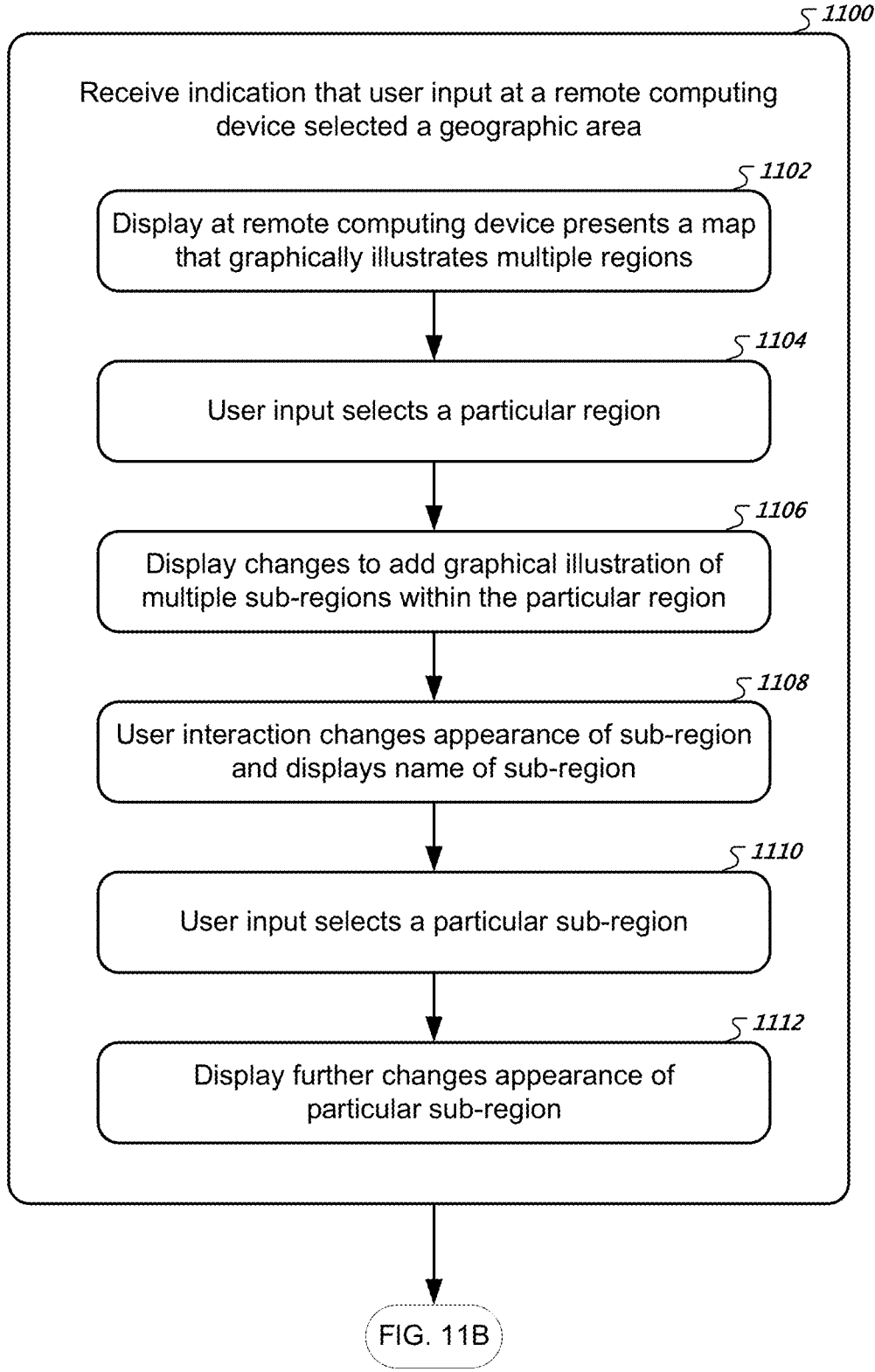
FIGS. 11A-E show a flowchart of operations for assigning contact records to user accounts.
Figure 11B:
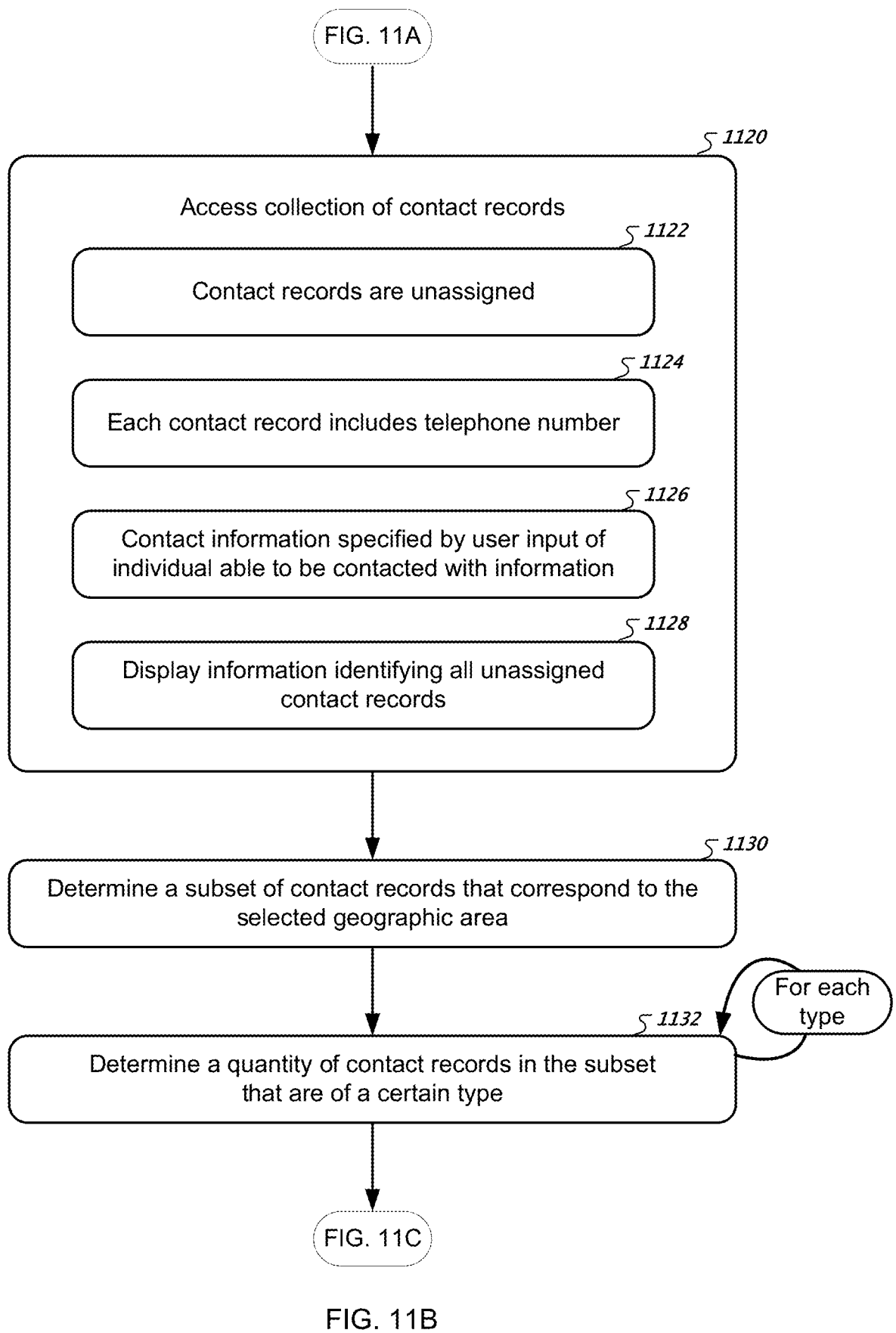
Figure 11C:
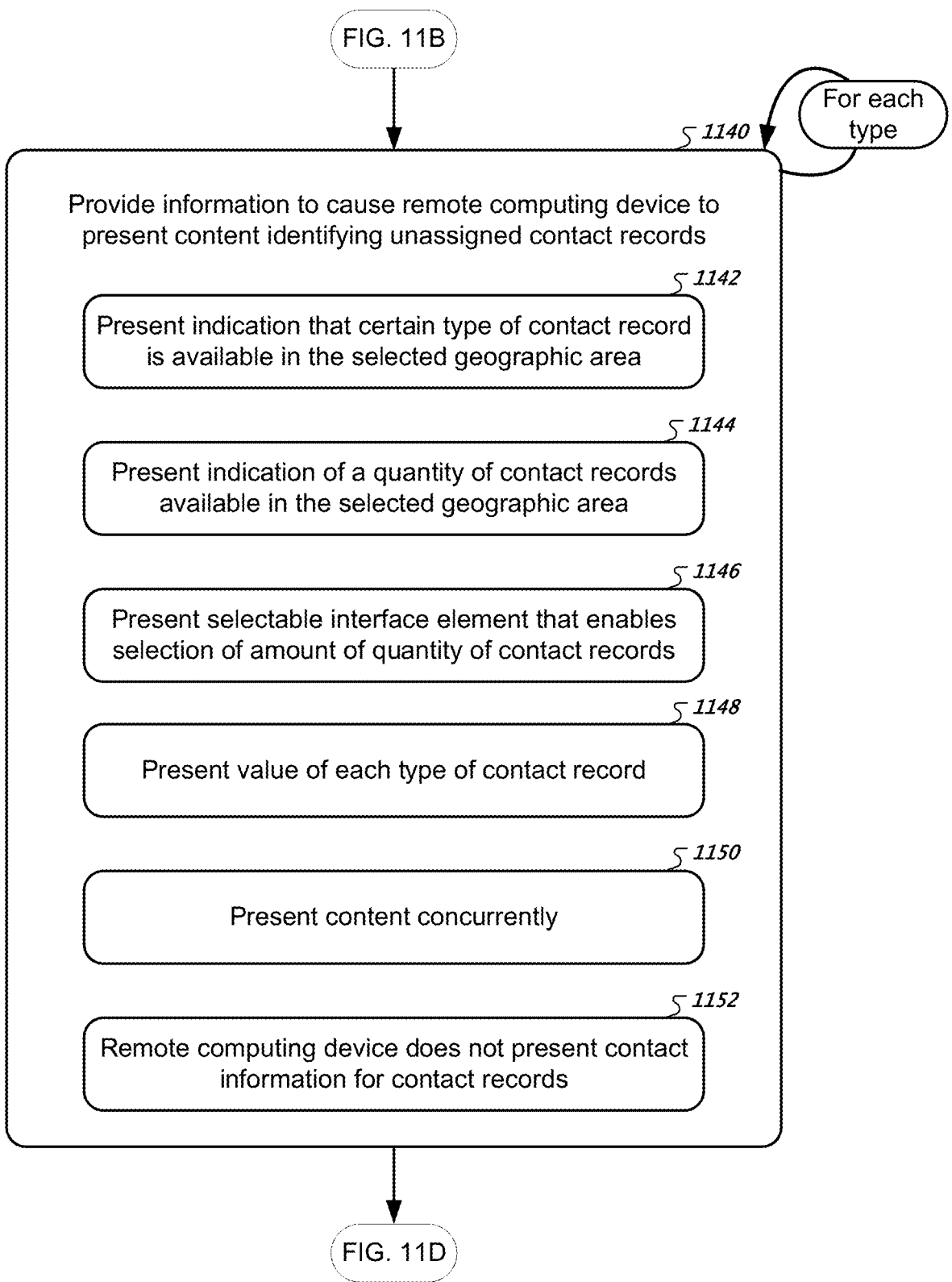
Figure 11D:
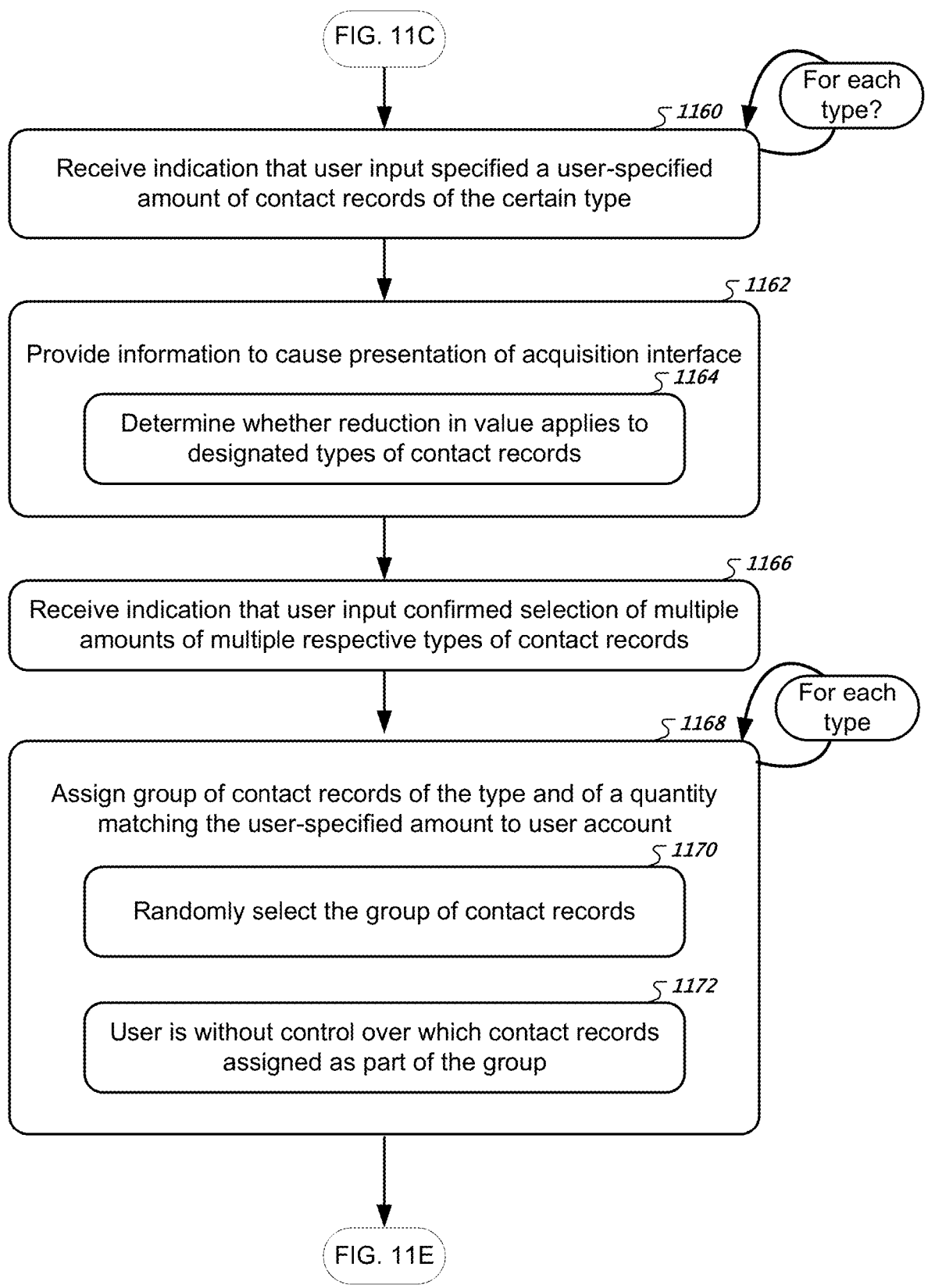
Figure 11E:
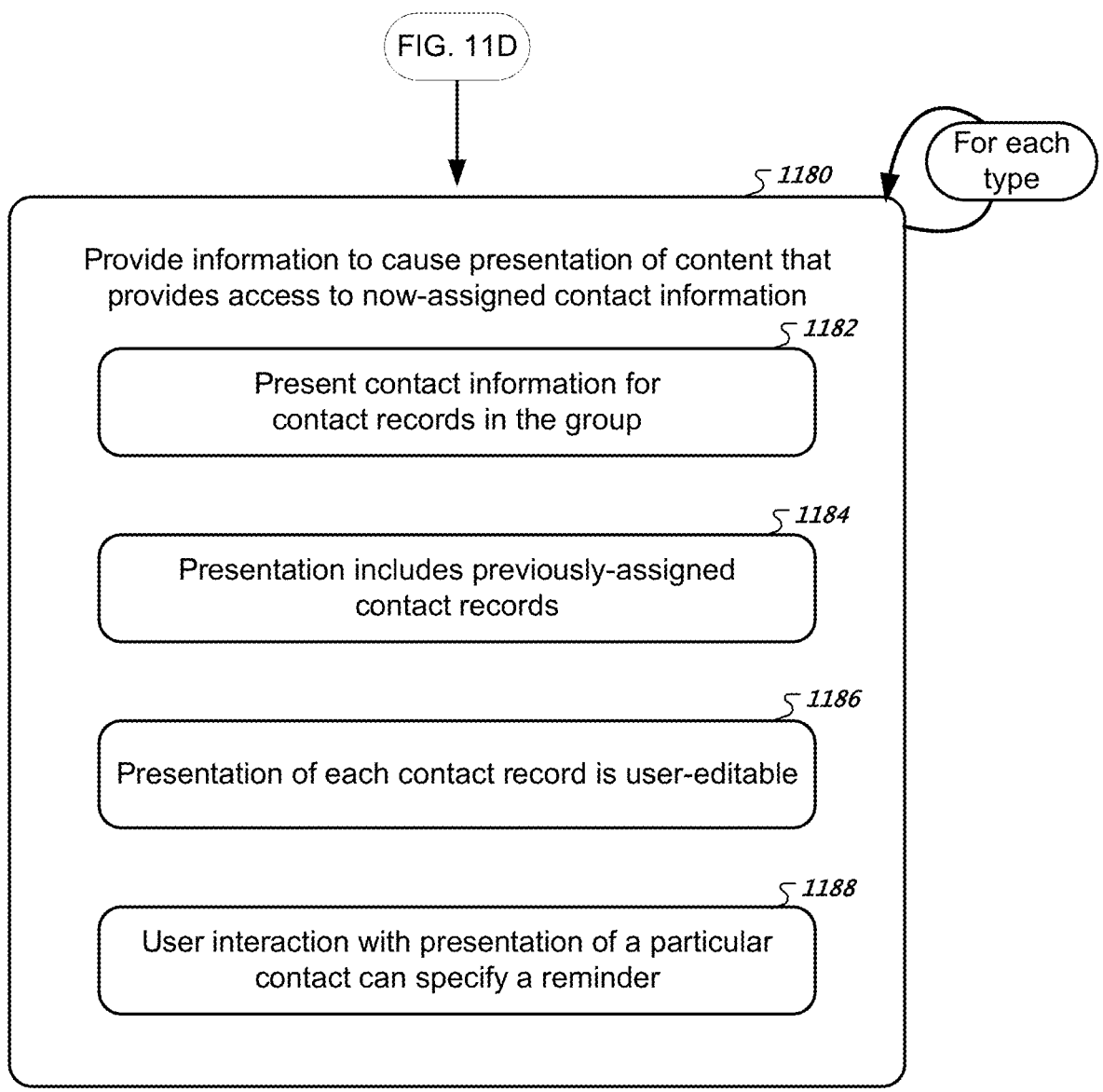

FIG. 3 shows the user interface after user input has selected a sub-region corresponding to Tarrant County in Texas. As shown in FIG. 3, the graphical representation 302 of Tarrant County is shaded to distinguish it from non-selected geographic regions. Selecting a geographic region causes pull-down menus 304*a-b* to update to display the selected geographic region.

Pull-down menus 304*a-b* not only show the name of the selected geographic region, but they provide an alternative mechanism to select the geographic region. For example, rather than user input interacting with the map to click or tap on a geographic region, a user can interact with pull-down menu 304*a* to select a state, and then interact with pull-down menu 304*b* to select a county within the state.

Selecting a region or sub-region causes the geographic filter system 118 to filter the total list of available contact records to just those that have been labelled with the selected geographic area, and communicate to the user device 160 information to update the user interface to present only contact record types available for the selected geographic region. Accordingly, the FIG. 3 user interface screen shows the availability of contact records originating from the internet 110, direct mail 112, and social media 114, but the user interface shows fewer types of contact records and the quantity of available contact records is reduced with respect to the FIGS. 2A-B user interface.

A user interacting with the FIG. 3 user interface is able to request an amount of zero or more of each type of contact record that is available for the selected geographic region. For example, user input may enter "1" into the text input field for the "New Internet Life" contact record type, enter "2" into the text input field for the "Instant Facebook" category, and select the "Add to cart" interface element 306. User input is then able to select a shopping cart interface element 308 in order to view a list of contact records added to the shopping cart.

FIG. 4 shows the shopping cart user interface for the currently logged-in user account. The user interface shows that eight different types of contact records have been added to the shopping cart, and lists for each type: the name 402 of the contact record type; the county 404 and state 406 from which the type of contact records were requested; the quantity 408 of contact records of the type that have been requested; the unit value 410 of each contact record of the specified type; any discount 412 in the value; and the total value 414 for all contact records of the respective type and from the listed geographic location.

The discount code input field 416 enables user input to specify a discount code. In response to user entry of any such code, the value modification system 126 compares the user-entered discount code to those discount codes listed in discount code datastore 132. If the user-entered discount code matches a discount code listed in datastore 132, the value modification system 126 can send information to the user device 160 to present a coupon discount 412, which represents an amount the unit cost of each contact record of a certain type has been reduced.

The request overview section 418 shows total overall value of all requested contact records, total discounts, and a final overall total of the request. User selection of the checkout 420 interface element causes the computing system to perform a process that enables the user to provide payment to complete the request (e.g., by providing credit card information).

Should payment by the user be authorized, the contact record assigning computing system 110 may perform operations to identify specific contact records of the types requested by the user and of the specified quantities. While the FIG. 4 shopping cart user interface screen shows that user input has requested contact records with certain characteristics (e.g., type, geographic location, and quantity), the identification of specific contact records from a collection of qualifying contact records to assign to the user is determined by system 110 without input by the user. The contact record selection may be random, or could be weighted to prioritize one or more metrics (e.g., assign the oldest contact records first).

Figure 5A:
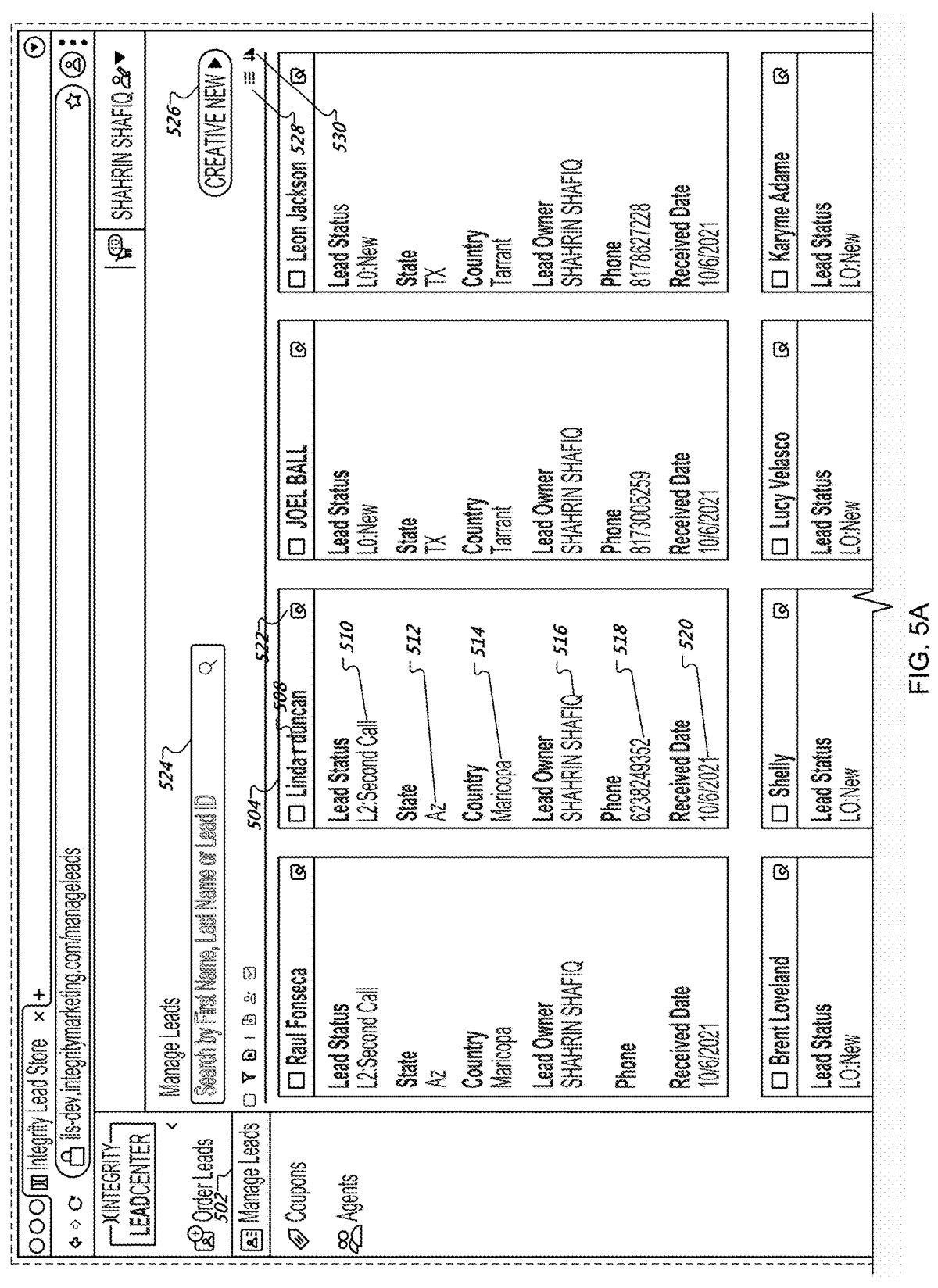

FIGS. 5A-B show a user interface screen presented to a user of the computing device 160 responsive to user input selecting the "Manage" contact records tab 502. This user interface screen shows all contact records that have been assigned to a user account that is logged into the computing device 160. The displayed contact records include those that the user account had requested through interaction with the aforementioned shopping cart user interface screen (see FIG. 4), possibly from multiple such requests (e.g., multiple different purchases).

The FIGS. 5A-B "Manage" contact record screen shows eight different contact records, each displayed within a rectangular portion of the screen and presenting a summary of contact record information therein. For example, the display of the second contact record 504 presents: (1) a name 508 of the individual represented by the contact record (e.g., "Linda r Duncan"), (2) a status 510 of contacts with the individual (e.g., an indication that a second call has been placed), (3) a state 514 in which the individual lives (e.g., "Arizona"), (4) a county 516 in which the individual lives (e.g., "Maricopa"), (4) an owner 518 of the contact record (e.g., the user account to which the contact record has been assigned, with FIGS. 5A-B showing multiple different owners for different contact records because FIGS. 5A-B show a user interface presented to an administrator user account rather than an agent user account), (5) a phone number 518 to contact the individual, and (6) a date at which the system received the information to originally form the contact record (e.g., a date at which contact record intake system 112 originally received information from any of the sources 140, 142, and 144 and created therefrom the contact record). User input is able to select interface element 522 to view a screen that displays more contact record information specific to the contact record 504 and enables editing at least some of that contact record information.

User input is able to interact with the search field 524 to search for contact records that match content entered into the search field 524 (e.g., should the collection of contact records assigned to the user span multiple pages). User input is also able to select a "Create New" interface element 526 to view a screen that enables a user to create a new contact record 504 (see FIG. 7 and description thereof, below). Interface element 530 is selectable to sort the contact records shown in the FIGS. 5A-B user interface screen into different orders. Interface element 528 is selectable to toggle the Manage contact records user interface from showing contact records in a card view (as shown in FIGS. 5A-B) to showing contact records in a list view (as shown in FIG. 6).

FIG. 6 shows the "Manage" contact records user interface of FIGS. 5A-B, but with contact records shown in a list view. As with FIGS. 5A-B, the FIG. 6 user interface screen shows, for each contact record, the first name 602 and last name 604 of the individual represented by the contact record, the status 606 of interaction with the individual, the state 608 and county 610 in which the individual lives, the owner 612 to which the contact record has been assigned, the date 614 at which the contact information was originally received, and the phone number 616 of the individual.

The sorting interface element 618 is user selectable to perform the same function as interface element 530 from FIGS. 5A-B, enabling user input to sort listed contacts by first name, last name, status, and received date, each respectively from beginning to end or end to beginning.

Figure 7:
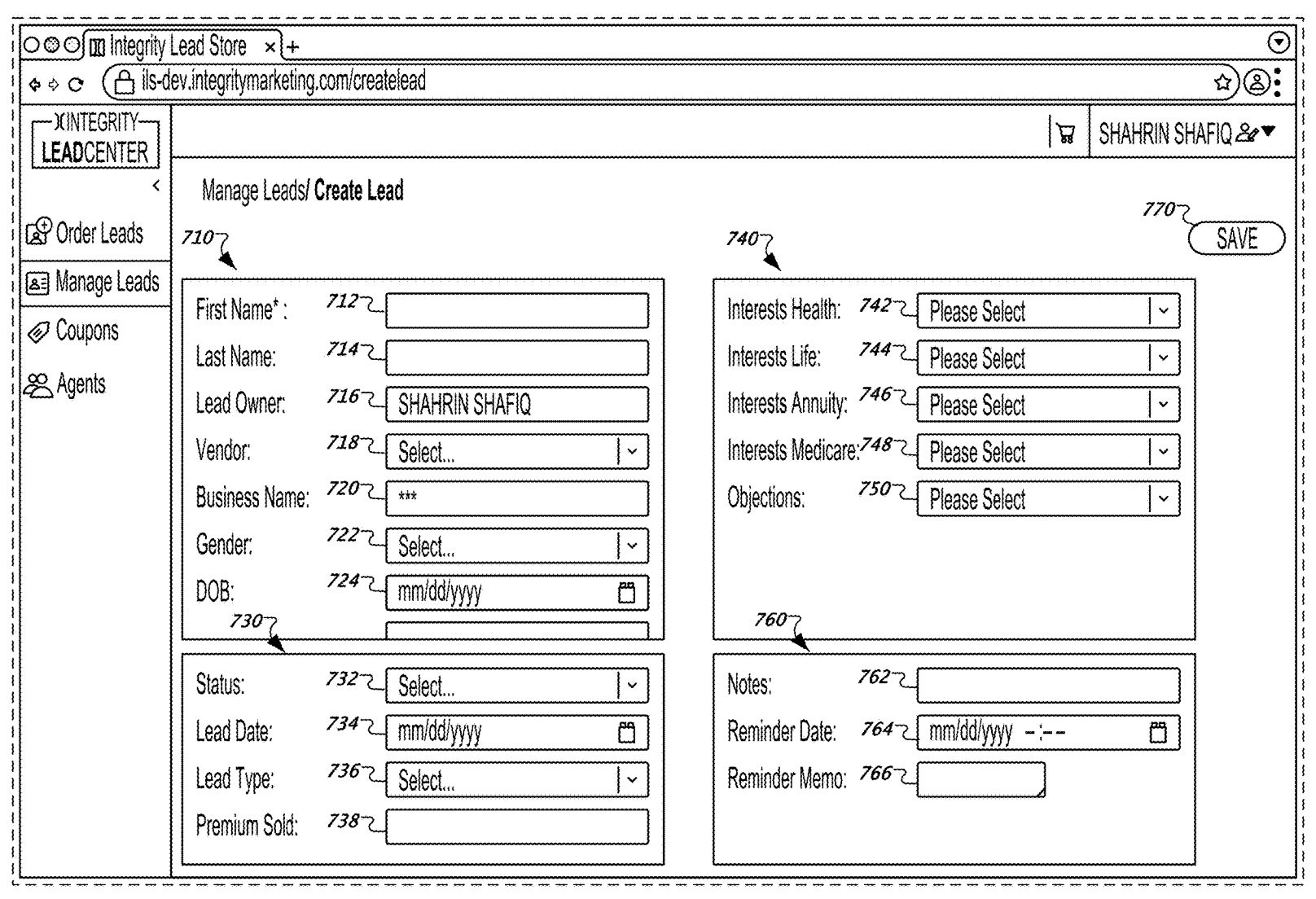

FIG. 7 shows a user interface screen for creating a new contact record, although the screen includes the same fields and is generally the same appearance as the screen that is shown when a user input selects to view the entirety of contact information for a user account, for example, responsive to user input selecting element 522 from to view more than just the summary 504 of contact information for an individual (an only difference may be that the FIG. 7 screen is titled "Create Lead" rather than "Edit Lead").

The FIG. 7 new/edit contact record screen presents four sections of contact record information: a demographic information section 710, a contact record formation section 730, an individual interests section 740, and a reminder section 760. Each section includes multiple fields which may or may not include information, some of which are editable, and all of which are accompanied by a text label that describes the corresponding field.

The demographic information section 710 includes a first name field 712 and a last name field 714. Each of these fields is a user-editable text field that user input can select (e.g., by clicking with a mouse or tapping with a finger on a touch-screen) to edit the text provided therein. The owner field 716 may display the individual to which the contact record has been assigned, and may not be user editable, at least when the logged-in user account is for an agent and not an administrator.

The vendor field 718 may display an entity from which the contact information was received (e.g., if third-party companies receive contact information and forward it to an entity that operates the contact record assigning computing system 110). The vendor field 718, upon user selection, may generate a pull-down menu of options from which to select. The business name field 718 may list an entity that currently manages the contact record, for example, among multiple subsidiaries of the entity that operates the contact record assigning computing system 110, and may also be a pull down menu.

The gender field 722 may present a gender of the individual represented by the contact record, and is also a pull down menu that enables user input to change the gender. The DOB (date of birth) field 724 may present a date of birth of the individual.

Although not shown in FIG. 7, the demographic information section 710 is scrollable to view other fields for other types of demographic information, such as spouse first name, spouse last name, spouse date of birth, street address, city, state, and county, all of which are user editable.

The contact record formation section 730 includes four fields. The status field 732 indicates a status of contact with an individual represented by the contact record. The status field 732 is a pull-down menu that provides the following user-selectable values: New, First Call, Second Call, Third Call, Voicemail, Text, Door Knock, and Appointment.

The date field 723 indicates a date at which the information to generate the contact record was received by the contact record intake system 112. The type field 736 indicates a type of the contact record, for example, the type specified by the contact record type classifier 114 and which was used to categorize the contact record into one of the different types presented in FIGS. 2-3. The type field 736 is a drop-down menu that is user-selectable to change the type of contact record from among a plurality of potential types of contact records. The premium sold field 738 indicates a value provided by the user for the contact record.

The individual interests section 740 includes various fields that describe concerns/interests of the individual represented by the contact record, and which can be selected based on information originally provided by the individual before the contact record was created (or provided by the individual during discussions between individual and the user to which the contact record has been assigned). These interests help the user to which the contact record has been assigned recall such interests and determine services and/or products that the individual may be interested in purchasing. The health interests field 742 is a pull-down menu that is user-selectable to indicate a type of health concern of the individual (e.g., cancer, diabetes, heart disease). Multiple interests can be selected, causing the field 742 to populate with multiple rectangular interface elements that display the selected interest with an adjacent "X" mark that enables user input to delete the selected interest.

The life interests field 744 is a pull-down menu that is user-selectable to indicate interests in life insurance products (e.g., mortgage protection, retirement, income). The annuity interests field 746 is a pull-down menu that is user-selectable to indicate interests annuity products (e.g., growth, endowment). The Medicare interests field 746 is a pull-down menu that is user-selectable to indicate types of Medicare in which the individual is interested and/or enrolled (e.g., MedSup, MedAdvantage). The objections field 750 is a pull-down menu that is user-selectable to indicate objections by the individual (e.g., prefers stocks, prefers bank investments, prefers bonds).

The reminder section 760 includes three fields that enable the user to set a reminder to contact the individual represented by the contact record at a later date. For example, a user can type content into a notes field 762 to be presented to the user upon later display of the reminder. The reminder date field 764 is user selectable to specify a date at which the system will remind the user to contact the individual. The reminder memo field 766 enables the user to specify additional text content to be presented by the user upon later display of the reminder.

Upon user entry of information for at least the reminder date field 764, the reminder system 124 will monitor a current date and compare it to the reminder date field 764 for each contact record for which a reminder has been set. If the current date matches the date in the reminder date field 764, the reminder system 124 can send a notification to the user.

For example, the user device may add, at a top of any of the user interfaces shown in FIGS. 2-10, a notification pop-up box that lists a name of the contact record and text previously entered by the user into the notes field 762 and the memo field 764. The notification may include a user-selectable link that, when selected by user input, causes navigate to the user interface shown in FIGS. 7, filled out with information specific to the contact record for which the reminder was set. In some examples, instead of or in addition to adding the notification pop-up box at the top of a user interface screen, the reminder system 124 sends an email to the user that includes the above-described content.

User selection of the save interface element 770 causes the system to save any information modified by user input in the FIG. 7 user interface, and navigate back to the previously-shown manage contacts user interface screen (e.g., one of FIGS. 5-6).

Figure 8:
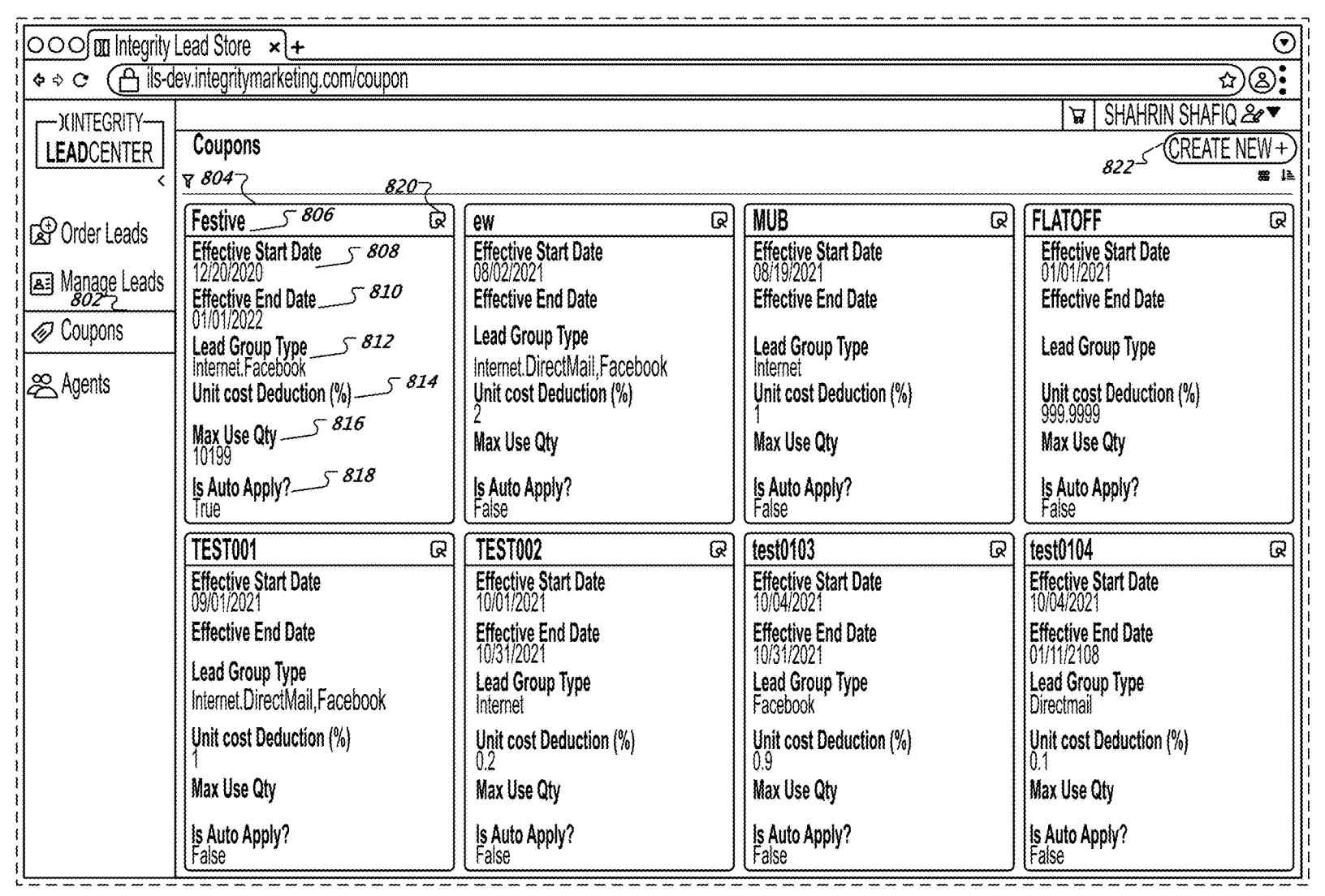

FIG. 8 shows a discount/coupon user interface screen. User selection of the coupon/discount tab 802 causes the user interface to navigate to the FIG. 8 user interface screen. The user interface screen shown in FIG. 9 may be that shown responsive to user-selection of the editing interface element 820 from the FIG. 8 user interface. Editing interface element 820 may only be shown to user accounts that have administrator privileges, and therefore only such user accounts will be able to access the discount user interface screen.

The discount user interface screen shows information on eight discounts, with discount 804 being one of those discounts. The information for each discount is bounded by a rectangular user interface box. For example, the user interface screen shows that discount 804 is has a name 806 of "Festive", a start date 808 of "Dec. 20, 2020", an end date 810 of "Jan. 1, 2022", a group type 812 of "Internet, Facebook", an unspecified unit cost deduction 814, a maximum use quantity 816 of "10199", and an auto apply setting 818 of "True".

User input may select editing interface element 820 to cause the user interface to display additional information regarding discount 804, and provide the ability to edit content for discount 804. User input may select the "Create New" interface element 822 to cause the user interface to present a screen that enables user-specification of a new discount.

Figure 9:
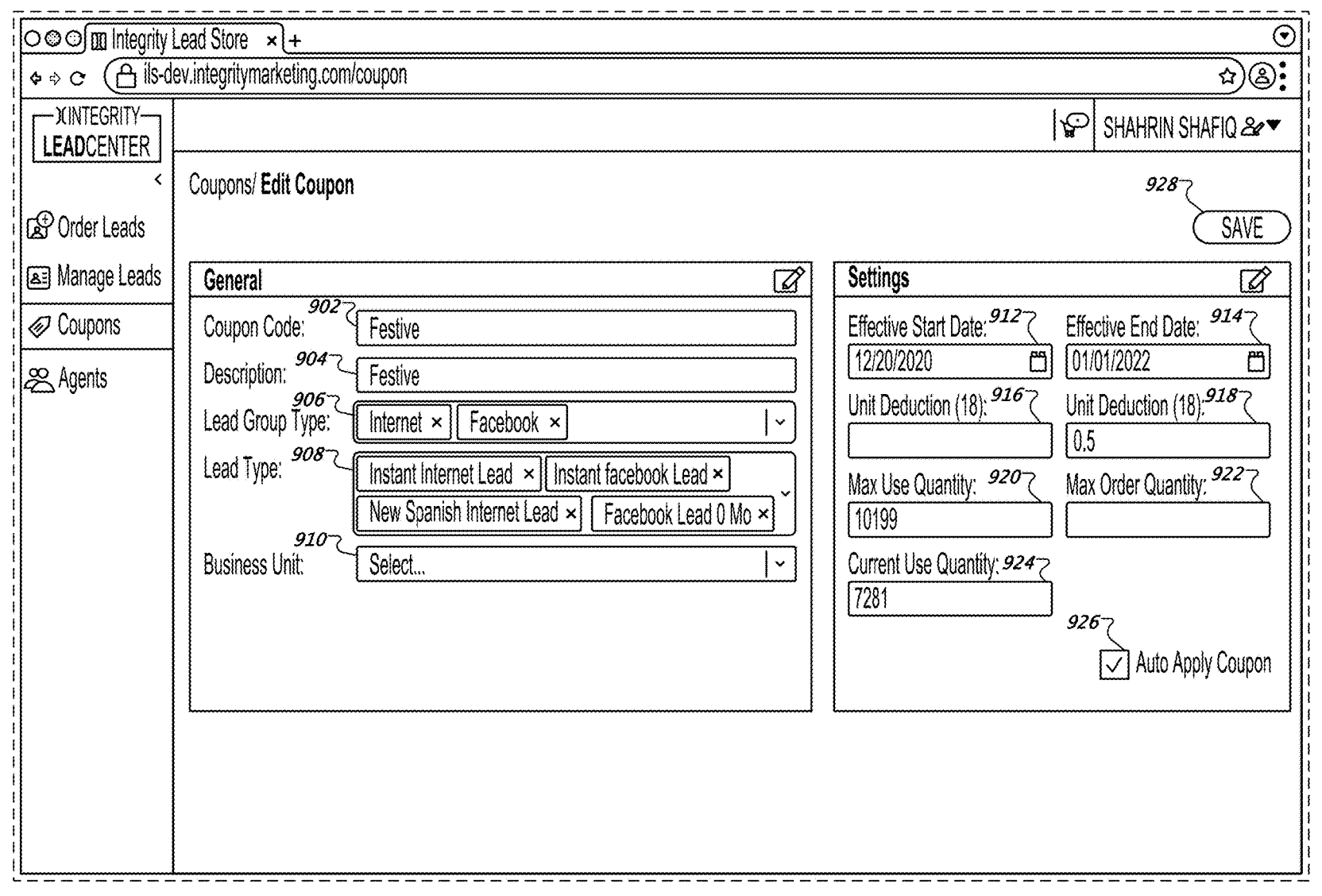

FIG. 9 shows a user interface screen for viewing additional information regarding a discount and/or editing information for that discount. The FIG. 9 screen may include the same fields as those shown responsive to user selection of the "Create New" interface element 822, with a main difference being that that the screen states "New Coupon" rather than "Edit Coupon.

Coupon code field 902 lists a name of the discount, and also a code for users to enter at the checkout screen in field 416 (FIG. 4) in order to receive the discount. Description field 904 lists a description of the coupon. Group type field 906 is a pull-down menu, and lists one or more group types of contact records to which the discount applies, here the "Internet" and "Facebook" group types. Type field 908 is a pull-down menu, and lists multiple different types of contact records to which the discount is to apply, here the "Instant Internet", "Instant Facebook", "New Spanish Internet", and "Facebook Lead 6 Mo" contact types. The business unit field 910 may list a business unit relevant to the discount.

Start date field 912 may list a date at which the discount is to start being available to users. A discount end date field 914 lists a date at which the discount is to stop being available to users. A unit deduction (%) field 916 lists a percentage discount per contact record to which the discount is applicable. A unit deduction ($) field 918 lists an amount in absolute dollars per contact record to which the discount is applicable. A max use quantity field 920 lists a maximum number of contact records that can receive the discount before the discount is no longer available. A current use quantity field 924 lists a current number of times this discount has been applied to user purchases. All these fields are editable by a user account with administrative privileges.

The auto apply selectable interface element 826 enables user input to activate and deactivate automatic activation of the discount. For example, upon a user having interacted with the FIG. 3 user interface and selecting element 308 to navigate to the shopping cart, the value modification system 126 may analyze the types of contact records selected by user input and determine whether a discount code applies to any such contact record type.

If the auto-apply coupon element 926 is selected, the value modification system 126 identifies whether there are any contact record types requested by the user that match a type listed in the type field 908 of any discount. If so, for any potential discount, the value modification system 126 determines (1) whether the current use quantity 924, plus an addition of an amount of requested contact records of the type, is less than the max use quantity 920, and (2) whether the current date is between the start date 912 and the end date 914. If these conditions are met, the value charged for each requested contact record is deducted by the unit deduction value by an amount specified in the percentage deduction field 916 or absolute dollars deduction field 918.

If the auto-apply coupon element 926 is not selected, the value modification system 126 only determines whether any requested contact record type matches the type specified in field 908 for coupon codes that a user may enter into field 416 (see FIG. 4). If so, the value modification system 126 then determines if the above-described conditions are met, and if so, deducts the amount charged for the relevant contact record types.

Figure 10:
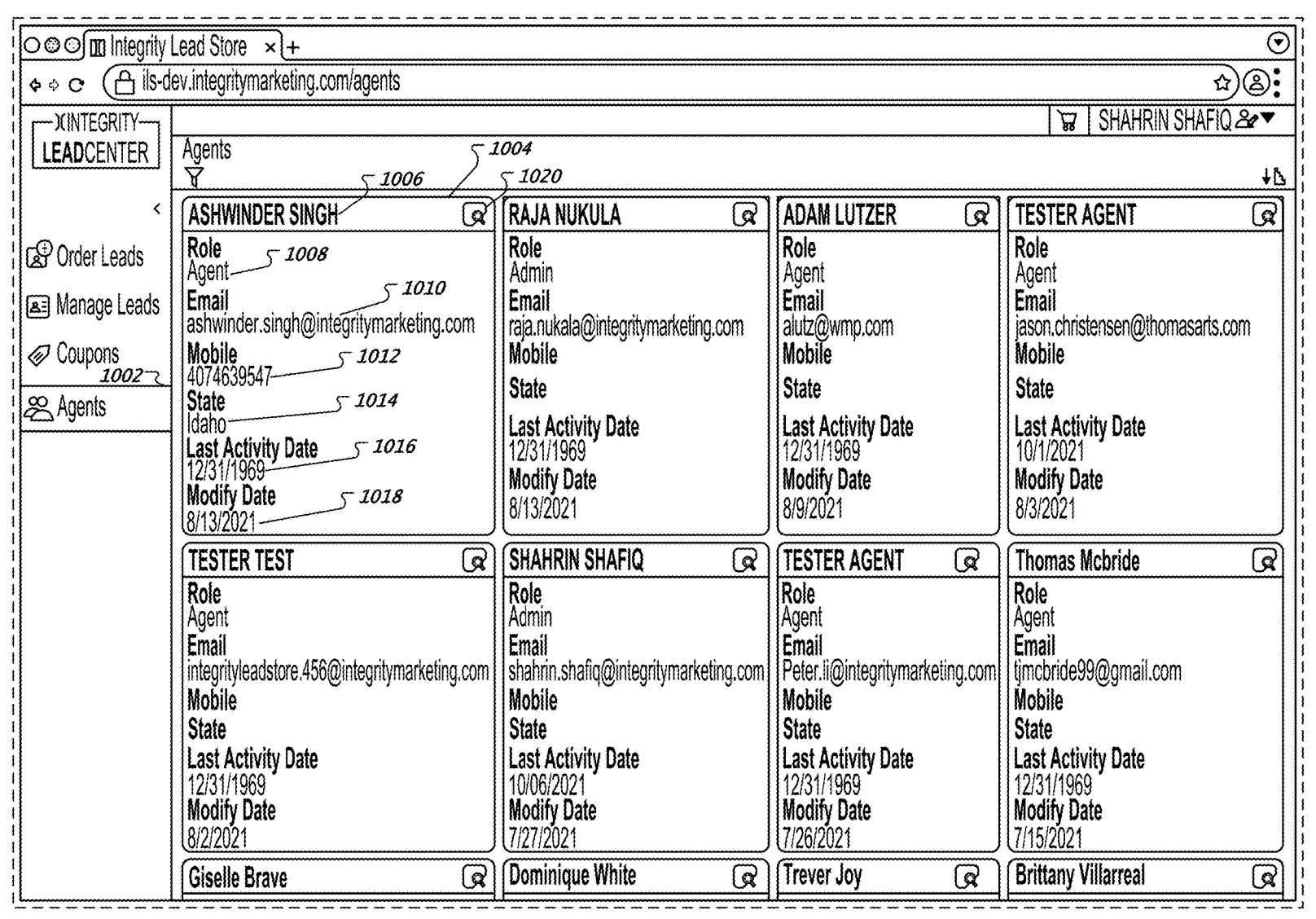

User input may select the save element 928 in order to save any changes made to the fields shown in the FIG. 9 user interface. FIG. 10 shows an agents user interface screen, which lists the agents with user accounts that enable them to access the user interfaces described herein (at least the Order and Manage interface screens, to the exclusion of the Coupons and Agents interface screens which are reserved to display and accessibility to user accounts with administrator privileges). User input that selects the agents tab 1002 causes user navigation to the FIG. 10 user interface screen, which shows information for twelve agent users. For example, agent card 1004 lists a name 1006 of the user, a role 1008 of the user, an email address 1010 of the user, a mobile telephone number 1012 of the user, a state 1014 in which the user lives, a last activity date 1016 at which the user last logged into the system, and a modify date 1018 that lists the last time information for the user was modified. User selection of the edit element 1020 causes the user interface to navigate to a different screen that enables user input to edit the above described information and view additional information relevant to the user account.

Flowchart of Operations for Assigning Contact Records to User Accounts

FIGS. 11A-E show a flowchart of operations for assigning contact records to user accounts. The operations are performed by the system shown in FIG. 1, and generates the user interface screens shown in FIGS. 2-10.

At box 1100, the computing system receives an indication that user input at a remote computing device selected a geographic area. For example, the computing system 110 receives information from agent computer 160 indicating that user input at that computer selected a geographic area. The selection of the geographic area can involve multiple operations at the agent computer 160 that display a map and receive user interaction therewith. Some of the operations performed by the agent computer may be specified/controlled by information sent from the computing system 110 to the agent computer 160, for example, information that forms a web page presented by a web browser executing at the agent computer 160.

At box 1102, the remote computing device presents a map that graphically illustrates multiple regions. For example, the agent computer 160 may present the FIGS. 2A-B user interface screen, which includes an interactive map 206.

At box 1104, user input selects a particular region. For example, user input may move a mouse cursor within the displayed boundaries of the state of Texas and click the mouse at that location, or tap such a location on a touchscreen with a finger or stylus.

At box 1106, the display changes to add a graphical illustration of multiple sub-regions within the particular region that was selected. For example, the computing device 160 may change the user interface from presenting the screen shown in FIGS. 2A-B to presenting the screen shown in FIG. 3.

At box 1108, user interaction with the map changes an appearance of a sub-region and displays the name of the sub-region. For example, as user input moves a mouse cursor across the graphical illustration of Texas in the FIG. 3 screen, the appearance of each county may change from a first state to a second state (e.g., to present a darker border and/or present a darker shade of color within boundaries of the county currently in focus), and a name of the county may appear to the upper-right of the county that is currently in focus.

At box 1110, user input selects a particular sub-region. For example, user input may click a mouse button or tap on a screen at a displayed location of a county, causing the county to become the currently-selected geographic region.

At box 1112, the display further changes the appearance of the sub-region. For example, the user interface may change a displayed representation of a selected county from the second state to a third state (assuming that the county previously had focus, if not from the first state to the third state). In this example, the third state is displaying the color yellow within boundaries of the county.

User input may alternatively select a geographic area by interacting with pull-down menus 304a-b. Upon user selection of a geographic region, the computing device 160 updates the user interface to show the state name of the selected county in the pull-down menu 304a, and to show the county name of the selected county in the pull-down menu 304b.

At box 1120, the computing system accesses a collection of contact records. For example, the contact record assigning computing system 110 may access the contact records datastore 130.

At box 1122, all or a subset of contact records in the datastore 130 may be unassigned. The unassigned contact records may be ones that were created by contact record intake system 112, and that have yet to be assigned to any agent user accounts.

At box 1124, at least some of the contact records include a telephone number. The contact records stored in datastore 130 may include information for any of the user interface fields shown in the FIG. 7 user interface, which enables users to edit contact record information.

At box 1126, at least some of the information in each contact record was originally specified by the individual represented by the contact record, and that a user is able to contact using the information. For example, an individual may have been browsing the internet, selected an advertisement for a product, and then entered that individual's contact information (e.g., telephone number) at a landing page for the advertisement. The individual's computer may send this contact information to the contact record intake system 112 for processing as an internet sourced contact record 140.

At box 1128, the agent computing device 160 displays information identifying all unassigned contact records. For example, the FIGS. 2A-B user interface screen may list the various different contact record types stored in the contact records datastore 150, and a quantity of available contact records of each such type.

At box 1130, the computing system determines a subset of contact records that correspond to the selected geographic area. For example, the geographic filter system 118, an executable component of the contact record assigning computing system 110, can determine which unassigned contact records in the contact records datastore 150 are labelled with the selected geographic location. With respect to FIG. 3, the system may determine which contact records specify a mailing address within Tarrant County, Texas.

At box 1132, the computing system may determine a quantity of contact records within the geographic-specific subset that are of a certain type. For example, the contact record assigning computing system 110 may determine a number of contact records relevant to Tarrant County that are of the "New Spanish Internet" type, which FIG. 3 indicates is two contact records. The computing system may repeat this quantity determination for each type of contact record.

At box 1140, the computing system provides information to cause the remote computing device to present content identifying the unassigned contact records. For example, the user interface generator 120 of the contact record assigning computing system 110 may send information to the agent computer 160 that can be used to render the web page shown in the FIG. 3 user interface screen, and particularly the lower portion of the screen that identifies the various types of unassigned/available contact records for the selected geographic area, and the quantity available for each type.

At box 1142, the user interface presents an indication that a certain type of contact record is available in the selected geographic area. For example, the user interface may display the text "Internet Life Lead 1 Mo" to indicate that there is at least one unassigned contact record of this type for Tarrant County.

At box 1144, the user interface presents an indication of a quantity of contact records available in the selected geographic area. For example, the FIG. 3 user interface displays an available quantity 224 of contact records of the "Internet Life Lead 1 Mo" type, which FIG. 3 indicates is "94".

At box 1146, the user interface presents a selectable interface element that enables selection of an amount of the available quantity 224 of contact records that the user decides to request. For example, the selectable interface element may be a text entry field, into which a user can type a number to specify the amount that the user decides to request. Typing a single number (e.g., one through 9) represents a single user actuation with a computerized input device.

In another example, the selectable interface element is a slider, and a single drag-and-drop of the slider without releasing the user input represents a single user actuation with a computerized input device. As such a user may specify a sub-set of a quantity of contact records to request with a single user actuation, in distinction to having to click a "request" button next to each of multiple contact records that the user would like to request (e.g., in distinction to clicking on five different "request" buttons next to five different representations of contact records).

At box 1148, the user interface presents a value of each type of contact record. For example, upon a user selecting the "additional element" interface element 222, the user interface presents a pop-up box that provides information on the contact record type, including a value to acquire a single contact record from the category (e.g., five dollars).

At box 1150, the user interface presents the above described items of content concurrently, for example, as shown in FIG. 3, FIG. 3 with the value also shown concurrently, or FIG. 4.

At box 1152, the user interface does not present contact information for the unassigned contact records. For example, the FIG. 3 user interface does not show the content of contact records, for example content that is presented in the FIGS. 5A-B user interface screen. (The user account may not yet have access to the FIGS. 5A-B user interface screen, or has access but is only able to view contact records that have been assigned to the user account.)

The user interface, as a collection of separate screens that are available to the user account for viewing, may not display any user account that has not yet been assigned to the user. Nor may the computing device 160 provide the user account a mechanism to access such information, even if not presented by the user interface (e.g., there is no way to download a file that includes personally identifiable information for unassigned contact records). The content that is not provided for unassigned contact records can include not providing information that specifies how to contact the individual represented by the contact record (e.g., not providing a phone number, not providing an email address). The content not provided can include a street address portion of a mailing address (e.g., in distinction to a generic county designation). The content not provided can also include a name of the individual.

The user device 160 may perform the operations of box 1140 for each type of unassigned contact record type that exists for the selected geographic area.

At box 1160, the computing system receives an indication that user input specified a user-specified amount of contact records of the certain type. For example, the contact record assigning computing system 110 may receive, from the agent computer 160, information that specifies a quantity entered by user input in field 226 (FIG. 3) or modified in field 408 (FIG. 4). The quantity may be more than one but less than an entire available quantity for at least some or all requested contact record types. The computing system may receive this information for each type of contact record requested by the user account.

At box 1162, the computing system provides information to cause a presentation of an acquisition interface. For example, the user interface may present the shopping cart user interface screen of FIG. 4, with which user input is able to modify the quantity desired of each type of contact record, view the total value/cost of all requested contact records, and specify one or more coupon codes in text entry field 416.

At box 1164, the computing system determines whether a reduction in value applies to designated types of contact records. For example, the value modification system 126 may determine whether any of the unassigned contact records types requested by the user account qualify for any of the discounts stored in discount datastore 152. The value modification system can apply some discounts automatically, based on an administrator user account having indicated so with interface element 926 (see FIG. 8), and can apply other discounts only if user input enters the discount code in text entry field 416.

At box 1166, the computing system receives an indication that user input confirmed selection of multiple amounts of multiple respective types of contact records. For example, the computing system may receive an indication that user input selected a "confirm" interface element, or successfully completed a financial transaction providing payment.

At box 1168, the computing system assigns a group of contact records to the user account, with the assigned contact records being of a type requested by the user account and of a quantity that matches the user-requested amount. For example, upon the contact record assigning computing system 110 receiving an indication that the user account has successfully completed a financial transaction as compensation for contact records, the contact record assignor 122 of the contact record assigning computing system 110 may access the contact records datastore 150 and change some contact records from being unassigned to being assigned to the user account that just completed the request.

At box 1170, the computing system randomly selects the group of contact records from the set of qualifying unassigned contact records, assuming that the user account has requested less than all of the qualifying unassigned contact records.

At box 1172, a user may be unable to select the specific contact records the user will receive, although the user may be able to specify general types of contact records and quantities thereof that will be assigned to the user.

At box 1180, the computing system provides information to cause the presentation of content that provides access to now-assigned contact information. For example, the user at agent computer 160 may view the "Manage" contact records user interface screen shown in FIGS. 5A-B. This screen may present a number of contact records that is increased by an amount that the user had requested, in comparison to the user interface screen before the request (e.g., which may have not presented any contact records, or may have presented contact records from previous requests).

At box 1182, the user interface presents contact information for contact records in the group. For example, the FIGS. 5A-B user interface screen lists the phone number for at least some of the displayed contact records.

At box 1184, the user interface presents previously-assigned contact records. For example, some of the contact records shown in the FIGS. 5A-B user interface may include contact records that were previously purchased by the user account.

At box 1186, the presentation of each contact record is user-editable. For example, a user may edit the presentation of the contact record 504 in FIGS. 5A-B by selecting the edit element 522, editing content of the contact record in a user interface screen similar to that shown in FIG. 7, and returning the FIGS. 5A-B user interface screen to view an edited presentation of the contact record.

At box 1188, user interaction with a portion of the presentation of a particular contact record can specify a reminder. For example, user input can interact with input fields 762, 764, and 766 (see FIG. 7) to respectively specify information for a reminder note field 762, a reminder date field 764, and a reminder memo field 766.

The operations of box 1180 can be performed for each type of contact record.

User Interface Screens for Defining a Recurring Distribution of Contact Records

FIGS. 12-17 show various different user interface screens that provide users with an ability to define a campaign that specifies characteristics of a recurring distribution of contact records to a user account.

FIG. 12 shows a user interface screen for viewing existing campaigns that provide recurring distribution of contact records to user accounts. A user the website described above with respect to FIGS. 1-11E may navigate to the screen shown in FIG. 12 by selecting the "Realtime Campaigns" tab 1202. Tab 1202 may be presented by one or more of the user interface screens of FIGS. 2-10, along with other tabs. The FIG. 12 screen shows multiple graphical portions 1204-1218 that each present criteria of a respective campaign that specifies characteristics for a recurring distribution of contact records to a user account.

For example, graphical portion 1204 shows criteria for a first campaign, including information 1220-1230, which indicates that the campaign is to configured to select contact records that (1) are of a "Final Expense" category of contact records (see item 1220), (2) are of an "Internet" contact record type within the "Final Expense" category (see item 1222), (3) designate the state of "California" (see item 1224), (4) designate any one or more of five user-selected counties in the state of California (see item 1226), and (5) amount to up to 25 contact records a week (see item 1228). The graphical portion 1204 further shows that the campaign is currently active (see item 1230) and that the contact records are to be distributed/assigned a "Rebekah Carlton" user account (see item 1230).

The FIG. 12 user interface may present information for more than the eight campaigns shown in FIG. 12, and an individual interacting with the user interface of FIG. 12 can interact with a search text field 1240 to type one or more search terms and perform a search for campaigns that satisfy the one or more search terms. The FIG. 12 user interface also includes an element 1242 that is user selectable to filter the presented set of campaigns down to a subset of campaigns that satisfy user-specified filter criteria. The FIG. 12 user interface also includes elements 1244 and 1246 that permit user input to selectively activate and deactivate individual campaigns.

While graphical portions 1204-1218 show information for campaigns that have already been created, element 1250 is user selectable to initiate a graphical workflow to create a new campaign.

Figure 13:
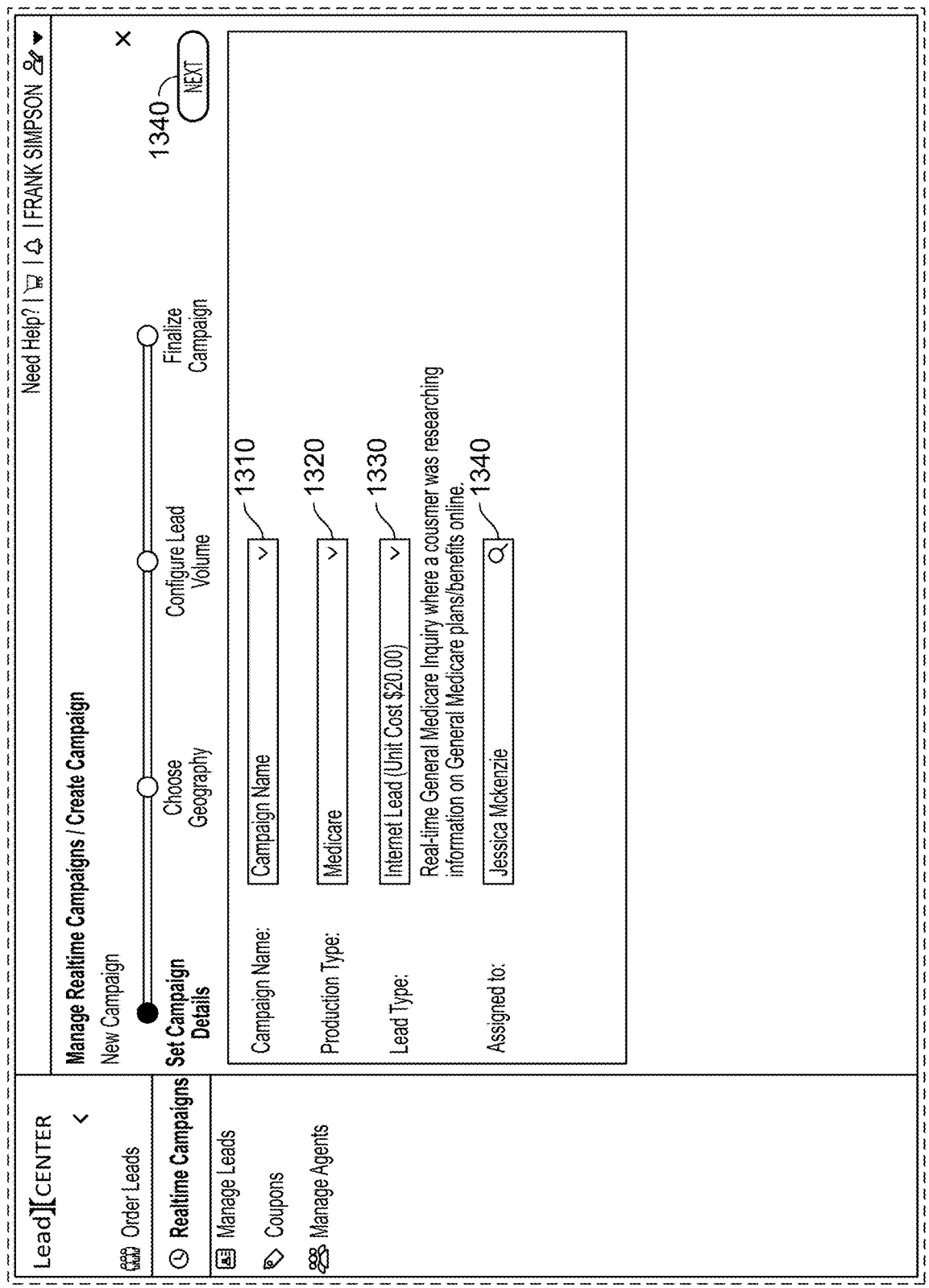

FIG. 13 shows a user interface that is presented upon user selection of the "New Campaign" element 1250 in FIG. 12. The FIG. 13 user interface includes various user interface components 1310, 1320, 1330, and 1340, with which user input may specify characteristics of the campaign that is being created. For example, text field 1310 enables user input to specify a name for the campaign being created (e.g., by typing a name with a keyboard). Drop down menu 1320 enables user input to select a category of contact records from among multiple available categories of contact records. Drop down menu 1330 enables user input to select a particular type of contact record from among various types of contact records that are part of the selected category of contact records.

Input field 1340 enables user input to specify a name of a user account to which contact records selected by the campaign are to be distributed. The user account to which the contact records are to be distributed may be different from a user account that is being used to create the record. For example, the user account "Jessica Mckenzie" to which contact records for the illustrated campaign are to be distributed is different from the user account "Frank Simpson" (see upper-right portion of FIG. 13) that is logged in and creating the campaign.

Figure 14:
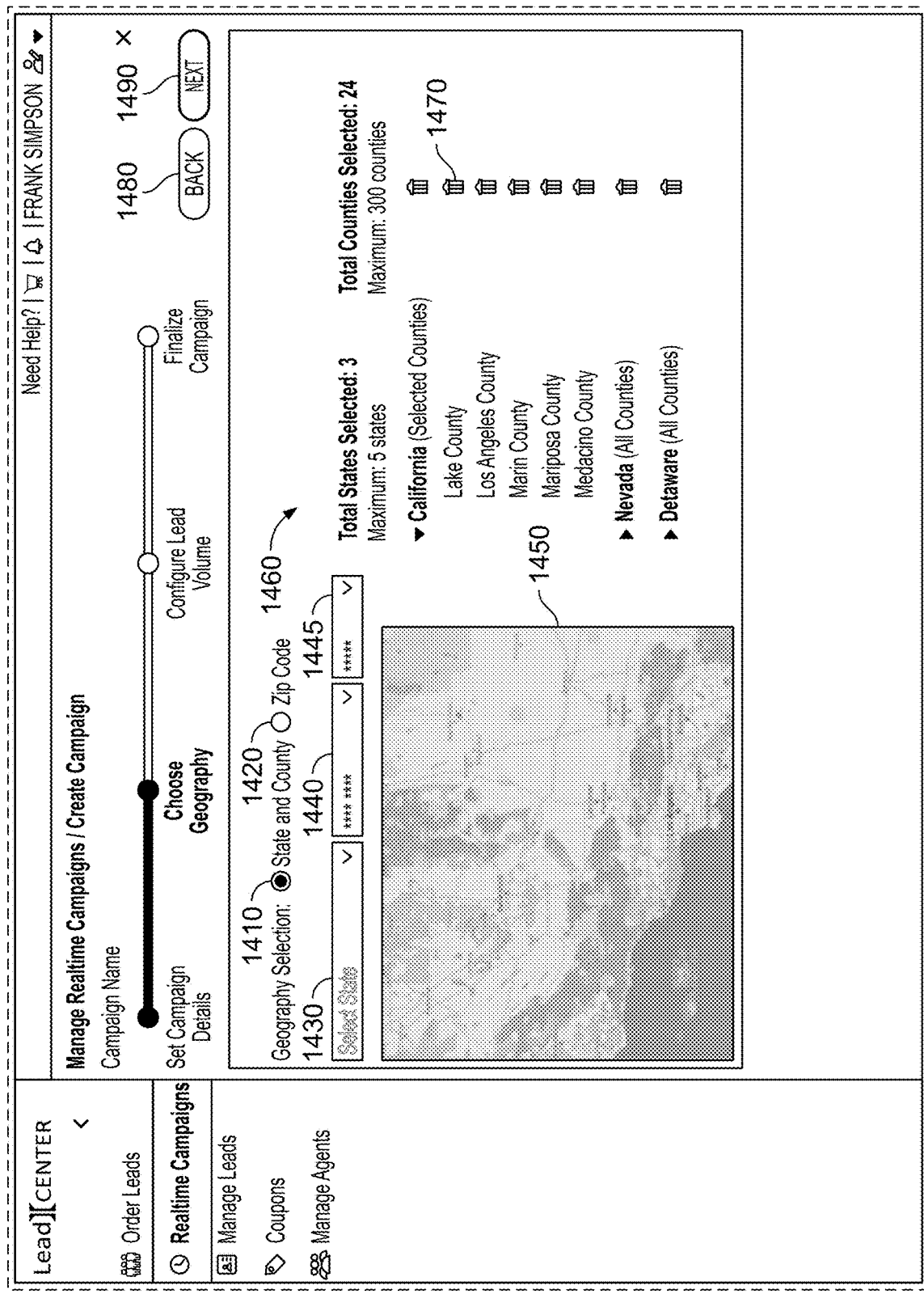

FIG. 14 shows a user interface presented upon user selection of the "Next" element 1340 in FIG. 13. The FIG. 14 user interface includes various interface elements that enable user input to select one or more geographical areas. For example, user input may interact with a "State and County" radio button element 1410 to select one or more geographic areas that are counties, and may interact with a "Zip Code" radio button element 1420 to select geographic areas that represent zip codes.

Because FIG. 14 shows that the "State and County" radio button element 1410 is currently selected, a bottom portion of the FIG. 14 user interface shows elements for selecting one or more counties. For example a "Select state" drop down menu 1430 enables user input to select a state, and a "Select Counties" drown down menu 1440 enables user input to select a county that forms part of a currently-selected state.

The map 1450 may change to show a currently-selected state and/or county, with a user being able to click on portions of the map to change a currently-selected county to a different currently-selected county (or select a first instance of a county, if no county had yet been selected). User selection of an "Add New" element 1445 adds a currently-selected county to a list 1460 of selected Geographic areas. The list 1460 shows counties that have been user-selected as part of the campaign being created, categorized by states to which the counties belong, with the list including portions that are user expandable and collapsible to show the counties that are selected for each state. Each county is accompanied by a "trash Can" element 1470 that is user selectable to remove the corresponding county from the list 1460.

Computer operation of and presentation of the map 1450, and user interaction therewith, may be the same as that of the map illustrated in FIG. 3 (although map 1450 may enable selection of multiple counties, while the map illustrated in FIG. 3 may enable selection of only a single county in certain embodiments). User selection of a back element 1480 causes a web browser that is presenting the FIG. 14 user interface to navigate to presentation of the FIG. 13 user interface.

Figure 15:
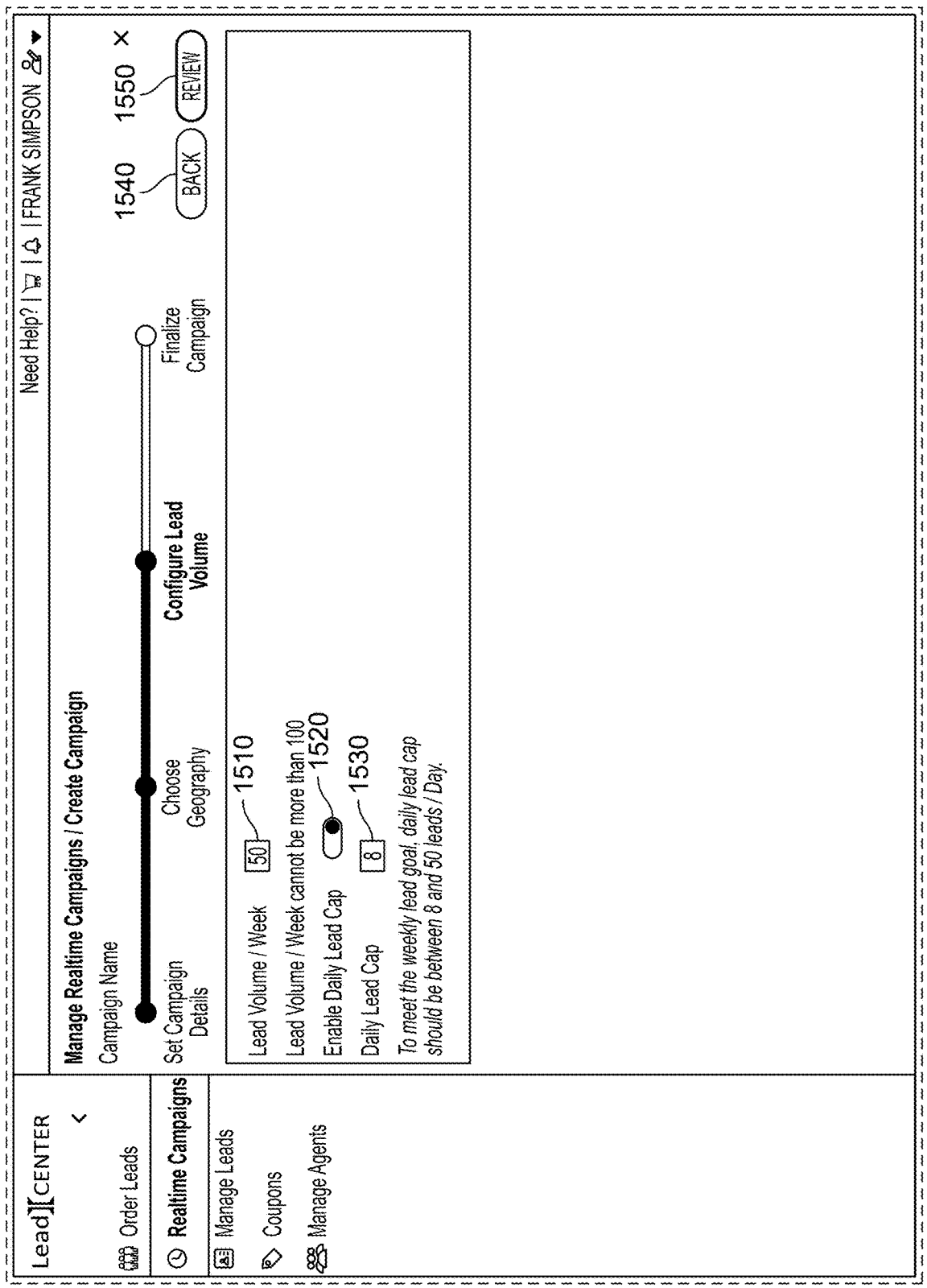

FIG. 15 shows a user interface presented upon user selection of the "Next" element 1490 in FIG. 14. The FIG. 15 user interface includes various interface elements that enable user input to specify how many contact records are to be distributed each recurring period of time, and whether those contact records should be distributed on a day-by-day basis, or in a bulk fashion each recurring period of time. For example, input element 1510 enables user input to specify a number of contact records to distribute each recurring period of time. In the FIG. 15 illustration, user input has entered "50" into input element 1510, to specify that the campaign is to distribute 50 contact records to the designated user account each week (if such a volume of contact records is available for distribution).

The "on/off" pill element 1520 enables user input to enable and disable a daily cap of contact records to be distributed to the designated user account, with the input element 1530 enabling user input to specify a maximum number of contact records to distribute each day if the daily cap is enabled. FIG. 15 illustrates that the daily cap is enabled (see element 1520) and that the daily cap is set to "8" contact records a day (see element 1530). User selection of "50" contact records a week, with a maximum of "8" a day, means that the computing system will be configured to distribute eight contact records each day (if such a volume is available each day) until the total weekly volume is satisfied.

Assuming an ample amount of contact records are available for distribution, this means that the designated user account will receive contact records each day of a week in the following amounts: 8, 8, 8, 8, 8, 8, 2. A last day of the recurring week period only receives two contact records because this distribution brings the total for the week to 50, which is the weekly volume specified by element 1510. Had only 7 contact records been available to distribute to the user account during one of the first few days of the week, then the last day of the recurring week period would have distributed 3 contact records. User selection of a back element 1540 causes a web browser that is presenting the FIG. 15 user interface to navigate to a presentation of the FIG. 14 user interface.

FIG. 16 shows a user interface presented upon user selection of the "Next" element 1550 in FIG. 15. The FIG. 16 user interface shows an overview of characteristics of the campaign being created. For example, the user interface specifies a user-selected category of contact records to form the campaign (see item 1610), a user-selected type of contact records to form the campaign (see item 1620), a quantity or volume of contact records to distribute each recurring period (see item 1630), a maximum quantity or volume of contact records to distribute each day (see item 1640), and various geographic areas that the contact records must designate (e.g., list as an address in the contact record) in order to be selected as part of the campaign (see item 1650). User selection of a back element 1670 causes a web browser that is presenting the FIG. 16 user interface to navigate to a presentation of the FIG. 15 user interface. User selection of a "Launch Campaign" element 1680 causes a computer system to activate the campaign, and begin selecting and distributing contact records on a recurring basis, as specified by the user-selected campaign characteristics.

Figure 17A:
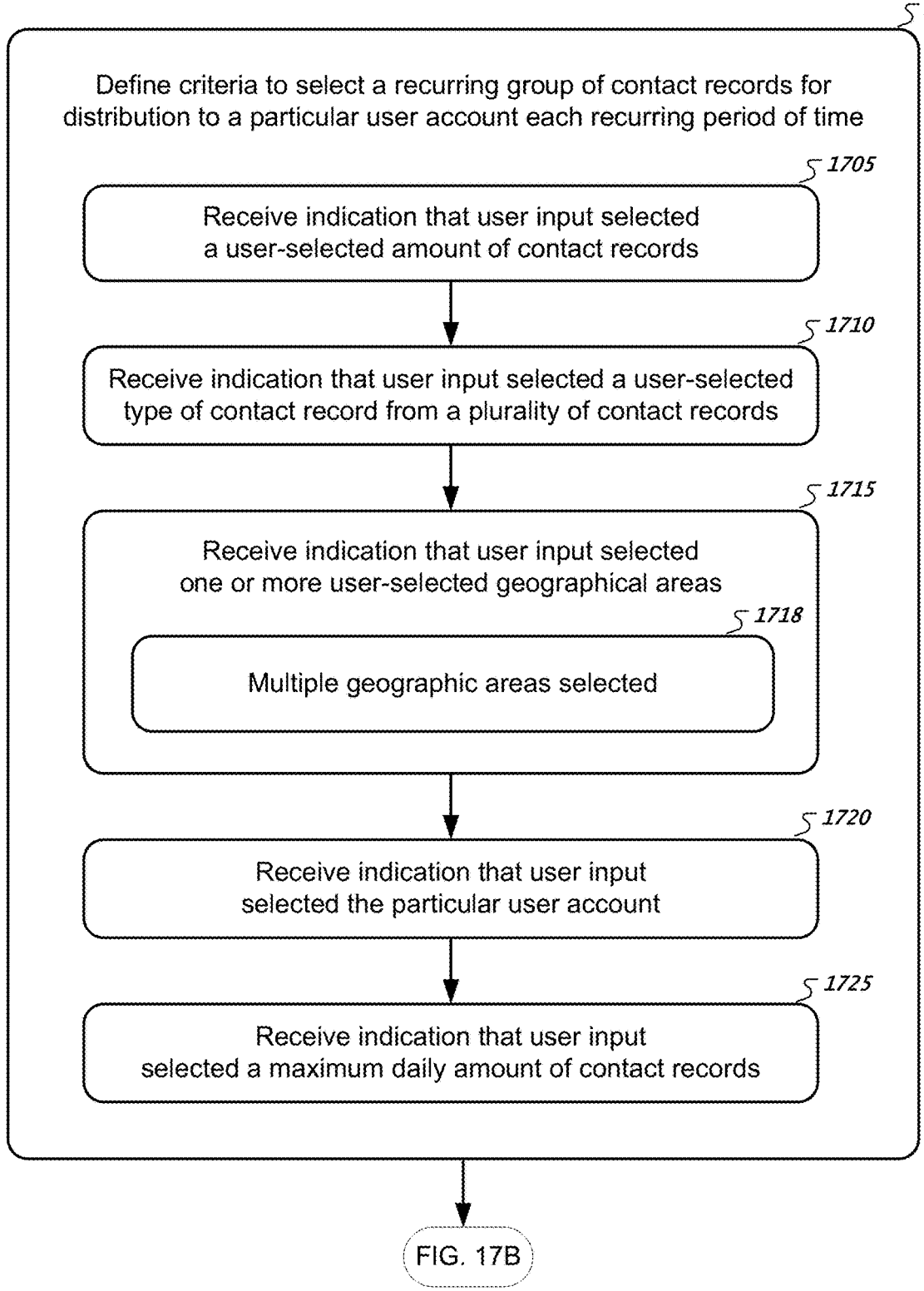
FIGS. 17A-C show a flowchart of operations for defining a recurring distribution of contact records.
Figure 17B:
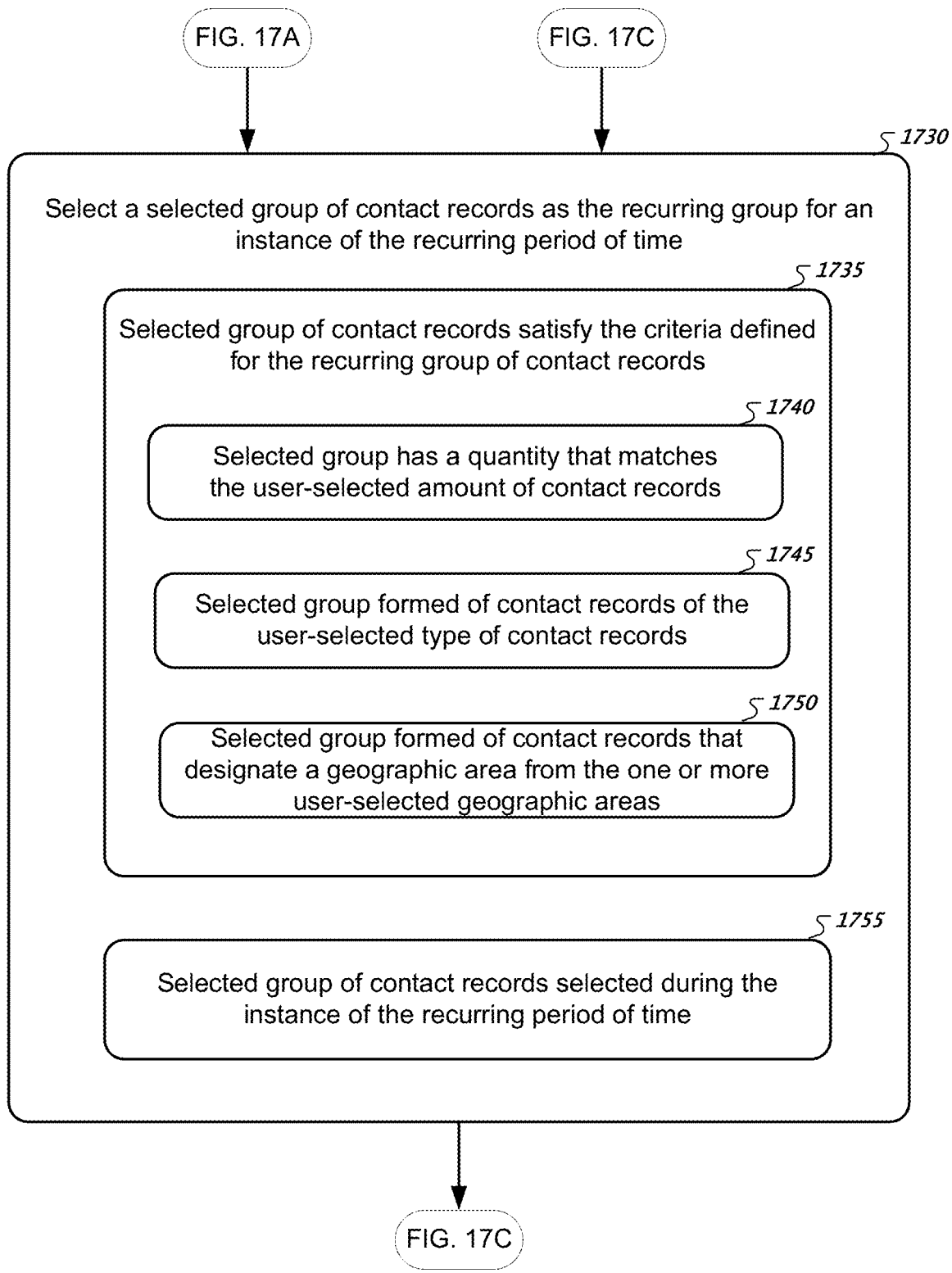
Figure 17C:
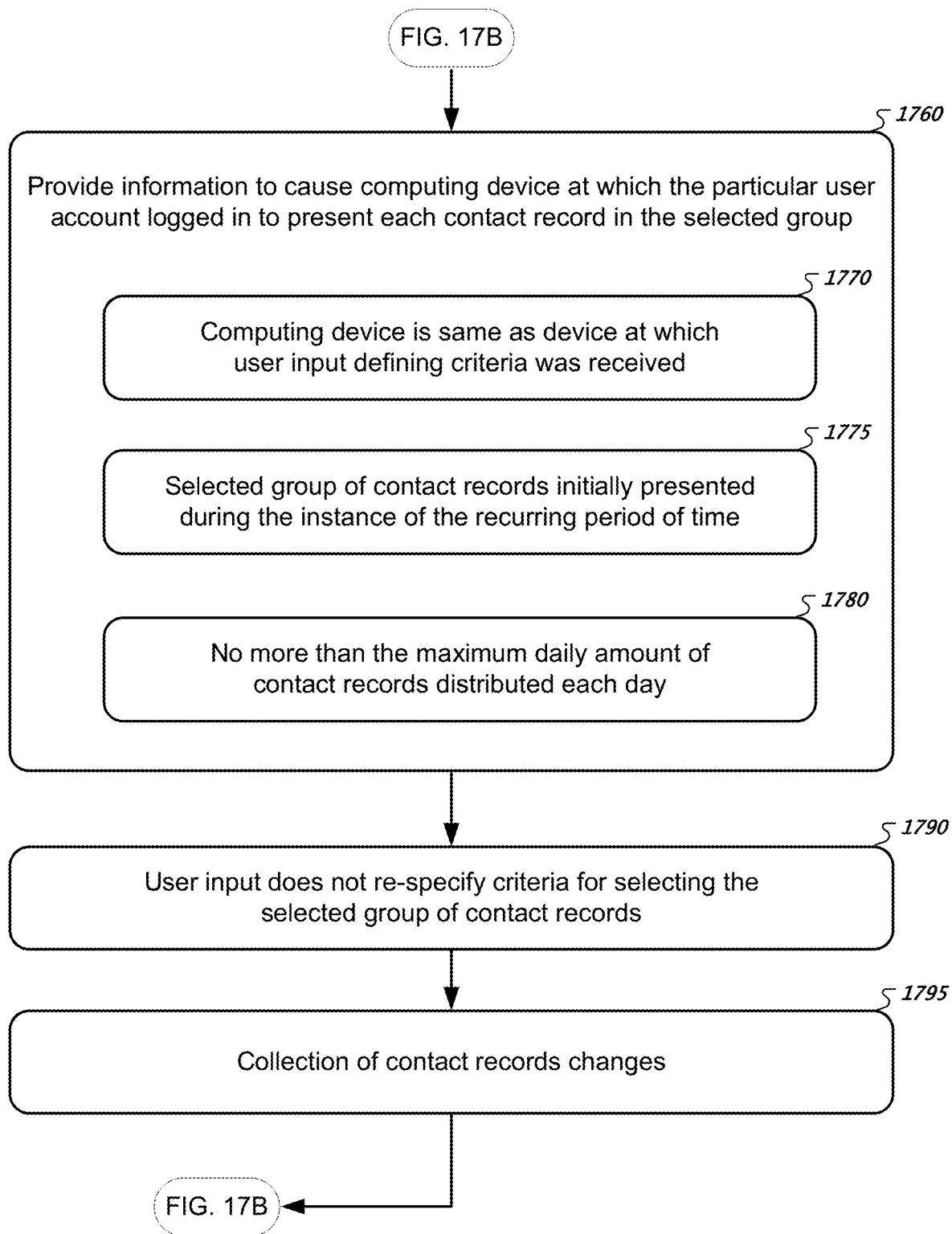

Flowchart of Operations for Defining a Recurring Distribution of Contact Records FIGS. 17A-C show a flowchart of operations for defining a recurring distribution of contact records to a user account. The operations are performed by the system shown in FIG. 1, and causes a computing device to present the user interface screens shown in FIGS. 12-16.

At box 1700, a computing system defines criteria to select a recurring group of contact records for distribution to a particular user account each instance a period of time recurs. For example, the computing system illustrated in FIG. 1 may present the user interfaces shown in FIGS. 12-16 (itself or by transmitting information to a different user device to present) as part of a process to define criteria that is used by the computing system to select, each week, a recurring group of contact records.

At box 1705, the computing system receives an indication that user input at a remote computing device selected the recurring group of contact records to have a user-selected amount of contact records. For example, an individual may use the remote computing device to sign into the computing system with a "Frank Simpson" user account, navigate to the user interface shown in FIG. 15, and specify "50" as a user-selected amount of contact records to distribute to a user account each recurring period of time. The user-selected amount of contact records may be transmitted from the remote computing device to the computing system, for example, responsive to user input that specifies the amount "50" (e.g., immediately), or upon user selection of the "Review" button 1550. The recurring period of time is a week in this instance and is not modifiable by the user account "Frank Simpson," but the recurring period of time may be different and/or user modifiable in other implementations.

At box 1710, the computing system receives an indication that user input at the remote computing device selected the recurring group of contact records to be formed of contact records of a user-selected type of contact record from among a plurality of types of contact records. For example, user input at the remote computing device may interact with element 1330 in the user interface of FIG. 13 to specify that the recurring group of contact records is to be formed of "Internet" contact records (e.g., such that contact records must be of this type in order to be selected each week for inclusion as part of the recurring group).

At box 1715, the computing system receives an indication that user input at the remote computing device selected the recurring group of contact records to be formed of contact records that designate one or more user-selected geographic areas from among a plurality of geographic areas. For example, user input at the remote computing device may interact with elements in the user interface of FIG. 14 to select one or more counties.

At box 1718, the user input selects multiple counties, such that a first instance of the recurring group of contact records for a first week includes some contact records that specify a first geographic area and not a second geographic area, and some contact records that specify the second geographic area but not the first geographic area.

At box 1720, the computing system receives an indication that user input at the remote computing device selected the recurring group of contact records to be distributed to the particular user account (from among a plurality of user accounts available for selection at the remote computing device). For example, user input at the remote computing device may interact with element 1340 in the user interface of FIG. 13 to specify the user account "Jessica Mckenzie". The user input may involve a user tying "Jessica", which results in the user interface present indications for multiple "Jessica" user accounts, after which user input may select "Jessica Mckenzie" from among the multiple presented indications of user accounts.

At box 1725, the computing system receives an indication that user input at the remote computing device selected a user-selected maximum daily amount of contact records to distribute to the particular user account each day during the recurring period of time. For example, user input at the remote computing device may interact with element 1530 in the user interface of FIG. 15 to specify that a maximum of "8" contact records (if that number is available on the given day) should be distributed to the "Jessica Mckenzie" each day, from among the "50" contact records (see element 1510) to be distributed to that user account each week.

At box 1730, the computing system selects, for distribution to the particular user account during an instance of the recurring period of time, a selected group of contact records (from among the collection of contact records) as the recurring group of contact records for the instance of the recurring period of time. For example, the computing system may determine that a new instance of the recurring period of time has occurred or is about to occur, such that a new week has begun or is about to begin shortly, and in response may select a group of contact records for distribution to a user-designated user account.

At box 1735, the selected group of contact records are selected by the computing system due to each contact record in the selected group satisfying criteria. Contact records that do not satisfy the criteria may not be selected for inclusion in the selected group, and the selected group may only contain contact records that satisfy the criteria.

At box 1740, the criteria includes the contact records in the selected group having a having a quantity that matches the user-selected amount of contact records (or lower if there are not enough contact records that satisfy the criteria). For example, the selected group of contact records may be populated with contact records until the user-selected amount of contact records includes fifty contact records, based on user input specifying "50" in element 1510 (see FIG. 15).

At box 1745, the criteria includes the contact records being formed of contact records of the user-selected type of contact record. For example, the computing system may select contact records that are of an "Internet lead" type of contact record (from among a larger collection of contact records that have not yet been assigned/distributed to user accounts), based on user input having previous interacted with element 1330 (see FIG. 13) to select "Internet Lead".

At box 1750, the criteria includes the contact records being formed of contact records that designate at least one geographic area of the one or more user-selected geographic areas. For example, the computing system may select contact records that are of the "Internet" type of contact record and that also list an address that is located within one of the user-specified counties included in list 1470 (see FIG. 1460).

At box 1755, the selected group of contact records are selected during the instance of the recurring period of time. For example, the computing system may select the contact records once a new week has begun. In some examples, the computing system selects the contact records before the new week has begun, but does not make the contact records available to the designated user account until the week has begun (e.g., by distributing information that identifies contact information for the selected contact records to a computer at which the designated user account has logged in).

In an example in which there are multiple campaigns that specify contact records with certain characteristics, and a limited number of contact records have such characteristics, the computing system may assign contact records according to one of multiple heuristics options.

In a first heuristic option, the computing system distributes contact records to a campaign that was first created. Stated another way, upon a new instance of a recurring period of time beginning or being about to begin, the computing system may execute a contact-record selection process for each campaign, in an order in which the campaigns were created, such that a group of contact records for a first-created campaign is populated with contact records before a group of contact records for a second-created campaign, and so forth. Should a campaign be unable to populate a group of contact records with contact records that satisfy all criteria specified for the campaign, a fewer-than-specified number of contact records will be distributed to the assigned user account for a given instance of a period of time.

In a second heuristic option, the computing system distributes contact records according to somewhat of a Round Robin methodology. With this option, the computing system tracks which campaign last received the certain type of contact record and the computing system provides one or more contact records of the certain type to a next campaign in sequence in a sequential list of campaigns that distribute the certain type of campaign (as new campaigns are created, they are added to the sequential list). As such, each recurring period of time (e.g., each week) a new campaign may get first access to contact records newly added to the plurality of contact records. This option may distribute contact records of the certain type one contact record at a time, rotating from one campaign to a next campaign in the sequential list with each distribution of a contact record. Alternatively, this option may distribute all contact records of the certain type requested by a first campaign, and then distribute all contact records of the certain type requested by a second campaign, and so forth until all contact records of the certain type are either distributed or all campaign requests are satisfied.

At box 1760, the computing system provides information to cause a computing device at which the particular user account logged in to present each contact record in the selected group. For example, a user may sit down at a computer and use a web browser to log into the computing system described with respect to FIG. 1, and navigate to the user interface shown in FIG. 6.

The FIG. 6 user interface, as described in additional detail above, shows a list of multiple contact records, with each contact record including a presentation of multiple types of information for the respective contact record, including name, location, and phone number. Contact records are presented in the list because: (1) the logged-in user (or someone using the same user account) added the contact record to the list through interaction with the "Create" contact record user interface of FIG. 7; (2) the logged-in user (or someone using the same user account) requested that contact records be assigned to the logged-in user, using the interfaces shown in FIGS. 2A-5B; and/or (3) one or more user-created campaigns have been defined to distribute contact records to the logged-in user on a recurring basis.

At box 1770, the computing device that presents each contact record in the selected group is the same device as that at which user input that defined the criteria was received. For example, the same device that showed the user interfaces of FIGS. 12-16 may be the same device that showed the user interfaces of FIGS. 2-5B. In such an instance, a user may create a campaign to assign a recurring group of contacts to themself. In some instances, however, a first user account may generate a campaign (see FIGS. 12-16), and a second user account may access and view contact records assigned/distributed by the campaign that was created by the first user account (see FIGS. 2-5B).

At box 1775, the computing device at which the particular user account is logged in initially/first presents the selected group of contact records during the instance of the recurring period of time. For example, if a campaign distributes an amount of contacts to a certain user account during a particular week, the user of that certain user account actually logs in to their account and navigates to the FIG. 6 user interface, causing the computing system to transmit information over the internet to cause a presentation of the FIG. 6 user interface—for a first time that week. As such, the contact records assigned during a given week are actually transmitted over the internet (in some sort of encoded form) to a device at which an end user has logged in during that given week, for example, in distinction to being distributed the week before or the week after.

At box 1780, providing information to cause the computing device at which the particular user account is logged in involves providing information to cause only a subset of the contact records to be transmitted to the particular user account during a given day. In such a circumstance, an entirety of the selected group of contact records is transmitted piecewise over multiple days (e.g., over multiple days during a single instance of a recurring period of time, such as a week). Such piecewise distribution may occur when user input has selected element 1520 (See FIG. 15) to place a daily cap on an amount of contact records distributed each day. User input may also specify a quantity that defines the daily cap using element 1530. As such, the provided information causes presentation of no more than the maximum daily amount (a daily cap) each day. If a user has not logged in for two days, those two days worth of newly-distributed contact records will present to the user for the first time upon logging in after the two-day absence.

As illustrated by the leftward/backward facing arrow at the bottom of FIG. 17, the operations of boxes 1730 through 1780 repeat with every occurrence of the period of time. For example, the operations may repeat every week.

Box 1790 indicates that user input does not re-specify selection criteria as the period of time re-occurs and re-occurs. In other words, once a campaign has been defined, for example through user interaction with the user interfaces illustrated in FIGS. 12-16, the computing system may regularly and in a recurring manner populate a selected group of contact records with contact records that satisfy the user-defined criteria and that are pulled from a collection of contact records, without user input separately requesting each distribution of contact records. Of course, user input may user input may modify a previously-defined criteria, for example, by selecting a campaign through the user interface of FIG. 12 and navigating to a campaign edit user interface.

Box 1795 indicates that the collection of contact records can change over time, and specifically among instance of the recurring period of time. For example, there may be various user accounts that receive contact records from the collection of contact records based on active campaigns and ah hoc requests for contacts. These distributions of contact records may delete the collection of contact records. At the same time, contact records may be newly added to the collection of contact records.

Implementing Systems

Figure 18:
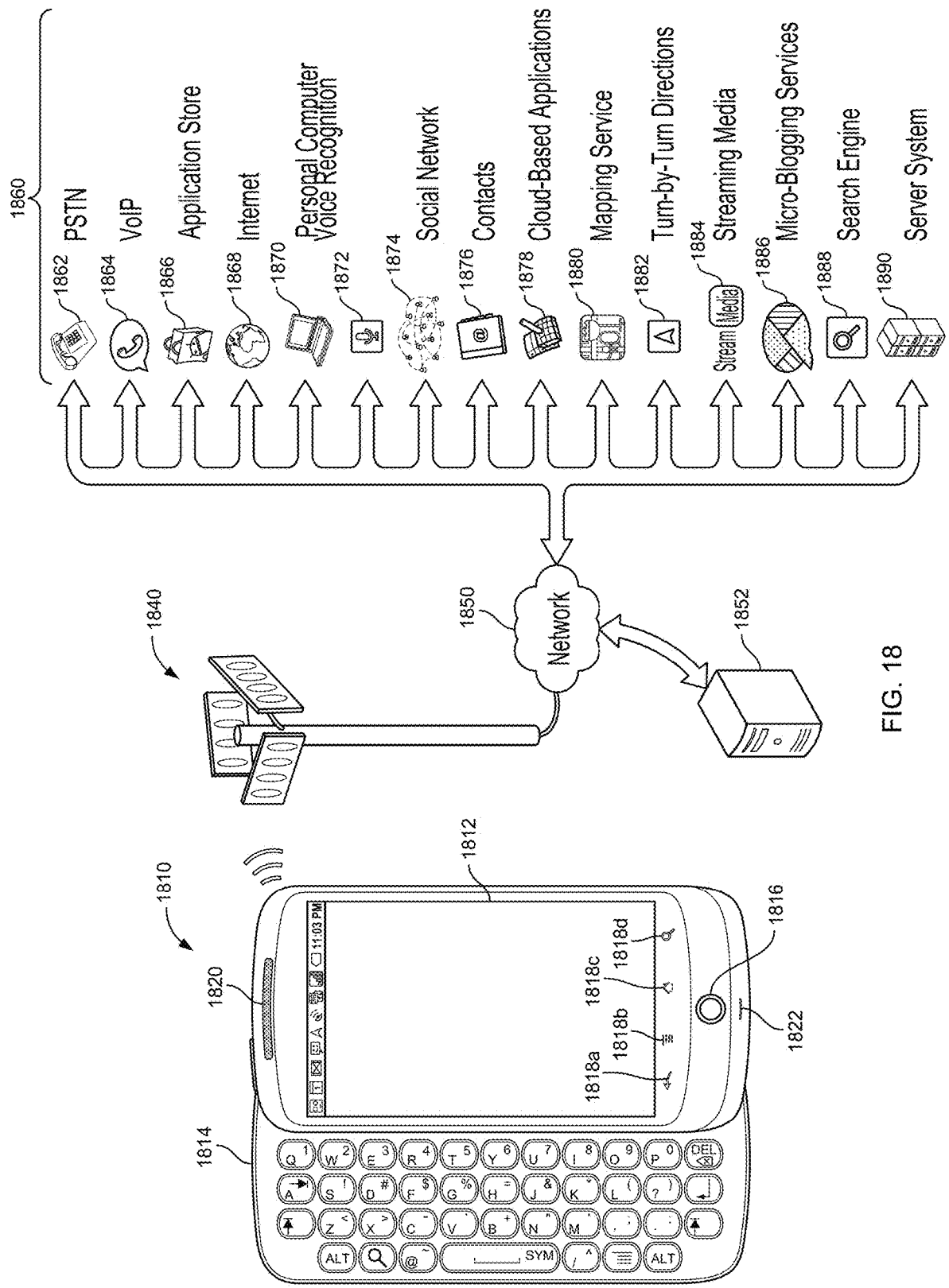
FIG. 18 is a conceptual diagram of a system that may be used to implement the systems and methods described in this document.

Referring now to FIG. 18, a conceptual diagram of a system that may be used to implement the systems and methods described in this document is illustrated. In the system, mobile computing device 1810 can wirelessly communicate with base station 1840, which can provide the mobile computing device wireless access to numerous hosted services 1860 through a network 1850.

In this illustration, the mobile computing device 1810 is depicted as a handheld mobile telephone (e.g., a smartphone, or an application telephone) that includes a touchscreen display device 1812 for presenting content to a user of the mobile computing device 1810 and receiving touch-based user inputs and/or presence-sensitive user input (e.g., as detected over a surface of the computing device using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 1814, physical buttons, trackballs, accelerometers, gyroscopes, and magnetometers).

Example visual output mechanism in the form of display device 1812 may take the form of a display with resistive or capacitive touch capabilities. The display device may be for displaying video, graphics, images, and text, and for coordinating user touch input locations with the location of displayed information so that the device 1810 can associate user contact at a location of a displayed item with the item. The mobile computing device 1810 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 1814, which may be a full qwerty keyboard or a traditional keypad that includes keys for the digits '0-9', '*', and '#.' The keyboard 1814 receives input when a user physically contacts or depresses a keyboard key. User manipulation of a trackball 1816 or interaction with a track pad enables the user to supply directional and rate of movement information to the mobile computing device 1810 (e.g., to manipulate a position of a cursor on the display device 1812).

The mobile computing device 1810 may be able to determine a position of physical contact with the touchscreen display device 1812 (e.g., a position of contact by a finger or a stylus). Using the touchscreen 1812, various "virtual" input mechanisms may be produced, where a user interacts with a graphical user interface element depicted on the touchscreen 1812 by contacting the graphical user interface element. An example of a "virtual" input mechanism is a "software keyboard," where a keyboard is displayed on the touchscreen and a user selects keys by pressing a region of the touchscreen 1812 that corresponds to each key.

The mobile computing device 1810 may include mechanical or touch sensitive buttons 1818a-d. Additionally, the mobile computing device may include buttons for adjusting volume output by the one or more speakers 1820, and a button for turning the mobile computing device on or off. A microphone 1822 allows the mobile computing device 1810 to convert audible sounds into an electrical signal that may be digitally encoded and stored in computer-readable memory, or transmitted to another computing device. The mobile computing device 1810 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 1810 may present a graphical user interface with the touchscreen 1812. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 1814. User-selection of the button may invoke the pre-defined action.

In some examples, the operating system provides a "desktop" graphical user interface that is displayed after turning on the mobile computing device 1810, after activating the mobile computing device 1810 from a sleep state, after "unlocking" the mobile computing device 1810, or after receiving user-selection of the "home" button 1818c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 1810 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 1812 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 1810 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 1810 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 1810. The mobile computing device 1810 may include a digital camera sensor, and corresponding image and video capture and editing software. An internet browser may enable the user to view content from a web page by typing in an addresses corresponding to the web page or selecting a link to the web page.

The mobile computing device 1810 may include an antenna to wirelessly communicate information with the base station 1840. The base station 1840 may be one of many base stations in a collection of base stations (e.g., a mobile telephone cellular network) that enables the mobile computing device 1810 to maintain communication with a network 1850 as the mobile computing device is geographically moved. The computing device 1810 may alternatively or additionally communicate with the network 1850 through a Wi-Fi router or a wired connection (e.g., ETHERNET, USB, or FIREWIRE). The computing device 1810 may also wirelessly communicate with other computing devices using BLUETOOTH protocols, or may employ an ad-hoc wireless network.

A service provider that operates the network of base stations may connect the mobile computing device 1810 to the network 1850 to enable communication between the mobile computing device 1810 and other computing systems that provide services 1860. Although the services 1860 may be provided over different networks (e.g., the service provider's internal network, the Public Switched Telephone Network, and the Internet), network 1850 is illustrated as a single network. The service provider may operate a server system 1852 that routes information packets and voice data between the mobile computing device 1810 and computing systems associated with the services 1860.

The network 1850 may connect the mobile computing device 1810 to the Public Switched Telephone Network (PSTN) 1862 in order to establish voice or fax communication between the mobile computing device 1810 and another computing device. For example, the service provider server system 1852 may receive an indication from the PSTN 1862 of an incoming call for the mobile computing device 1810. Conversely, the mobile computing device 1810 may send a communication to the service provider server system 1852 initiating a telephone call using a telephone number that is associated with a device accessible through the PSTN 1862.

The network 1850 may connect the mobile computing device 1810 with a Voice over Internet Protocol (VoIP) service 1864 that routes voice communications over an IP network, as opposed to the PSTN. For example, a user of the mobile computing device 1810 may invoke a VoIP application and initiate a call using the program. The service provider server system 1852 may forward voice data from the call to a VoIP service, which may route the call over the internet to a corresponding computing device, potentially using the PSTN for a final leg of the connection.

An application store 1866 may provide a user of the mobile computing device 1810 the ability to browse a list of remotely stored application programs that the user may download over the network 1850 and install on the mobile computing device 1810. The application store 1866 may serve as a repository of applications developed by third-party application developers. An application program that is installed on the mobile computing device 1810 may be able to communicate over the network 1850 with server systems that are designated for the application program. For example, a VoIP application program may be downloaded from the Application Store 1866, enabling the user to communicate with the VoIP service 1864.

The mobile computing device 1810 may access content on the internet 1868 through network 1850. For example, a user of the mobile computing device 1810 may invoke a web browser application that requests data from remote computing devices that are accessible at designated universal resource locations. In various examples, some of the services 1860 are accessible over the internet.

The mobile computing device may communicate with a personal computer 1870. For example, the personal computer 1870 may be the home computer for a user of the mobile computing device 1810. Thus, the user may be able to stream media from his personal computer 1870. The user may also view the file structure of his personal computer 1870, and transmit selected documents between the computerized devices.

A voice recognition service 1872 may receive voice communication data recorded with the mobile computing device's microphone 1822, and translate the voice communication into corresponding textual data. In some examples, the translated text is provided to a search engine as a web query, and responsive search engine search results are transmitted to the mobile computing device 1810.

The mobile computing device 1810 may communicate with a social network 1874. The social network may include numerous members, some of which have agreed to be related as acquaintances. Application programs on the mobile computing device 1810 may access the social network 1874 to retrieve information based on the acquaintances of the user of the mobile computing device. For example, an "address book" application program may retrieve telephone numbers for the user's acquaintances. In various examples, content may be delivered to the mobile computing device 1810 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 1810 may access a personal set of contacts 1876 through network 1850. Each contact may identify an individual and include information about that individual (e.g., a phone number, an email address, and a birthday). Because the set of contacts is hosted remotely to the mobile computing device 1810, the user may access and maintain the contacts 1876 across several devices as a common set of contacts.

The mobile computing device 1810 may access cloud-based application programs 1878. Cloud-computing provides application programs (e.g., a word processor or an email program) that are hosted remotely from the mobile computing device 1810, and may be accessed by the device 1810 using a web browser or a dedicated program. Example cloud-based application programs include GOOGLE DOCS word processor and spreadsheet service, GOOGLE GMAIL webmail service, and PICASA picture manager.

Mapping service 1880 can provide the mobile computing device 1810 with street maps, route planning information, and satellite images. An example mapping service is GOOGLE MAPS. The mapping service 1880 may also receive queries and return location-specific results. For example, the mobile computing device 1810 may send an estimated location of the mobile computing device and a user-entered query for "pizza places" to the mapping service 1880. The mapping service 1880 may return a street map with "markers" superimposed on the map that identify geographical locations of nearby "pizza places."

Turn-by-turn service 1882 may provide the mobile computing device 1810 with turn-by-turn directions to a user-supplied destination. For example, the turn-by-turn service 1882 may stream to device 1810 a street-level view of an estimated location of the device, along with data for providing audio commands and superimposing arrows that direct a user of the device 1810 to the destination.

Various forms of streaming media 1884 may be requested by the mobile computing device 1810. For example, computing device 1810 may request a stream for a pre-recorded video file, a live television program, or a live radio program. Example services that provide streaming media include YOUTUBE and PANDORA.

A micro-blogging service 1886 may receive from the mobile computing device 1810 a user-input post that does not identify recipients of the post. The micro-blogging service 1886 may disseminate the post to other members of the micro-blogging service 1886 that agreed to subscribe to the user.

A search engine 1888 may receive user-entered textual or verbal queries from the mobile computing device 1810, determine a set of internet-accessible documents that are responsive to the query, and provide to the device 1810 information to display a list of search results for the responsive documents. In examples where a verbal query is received, the voice recognition service 1872 may translate the received audio into a textual query that is sent to the search engine.

These and other services may be implemented in a server system 1890. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 19:
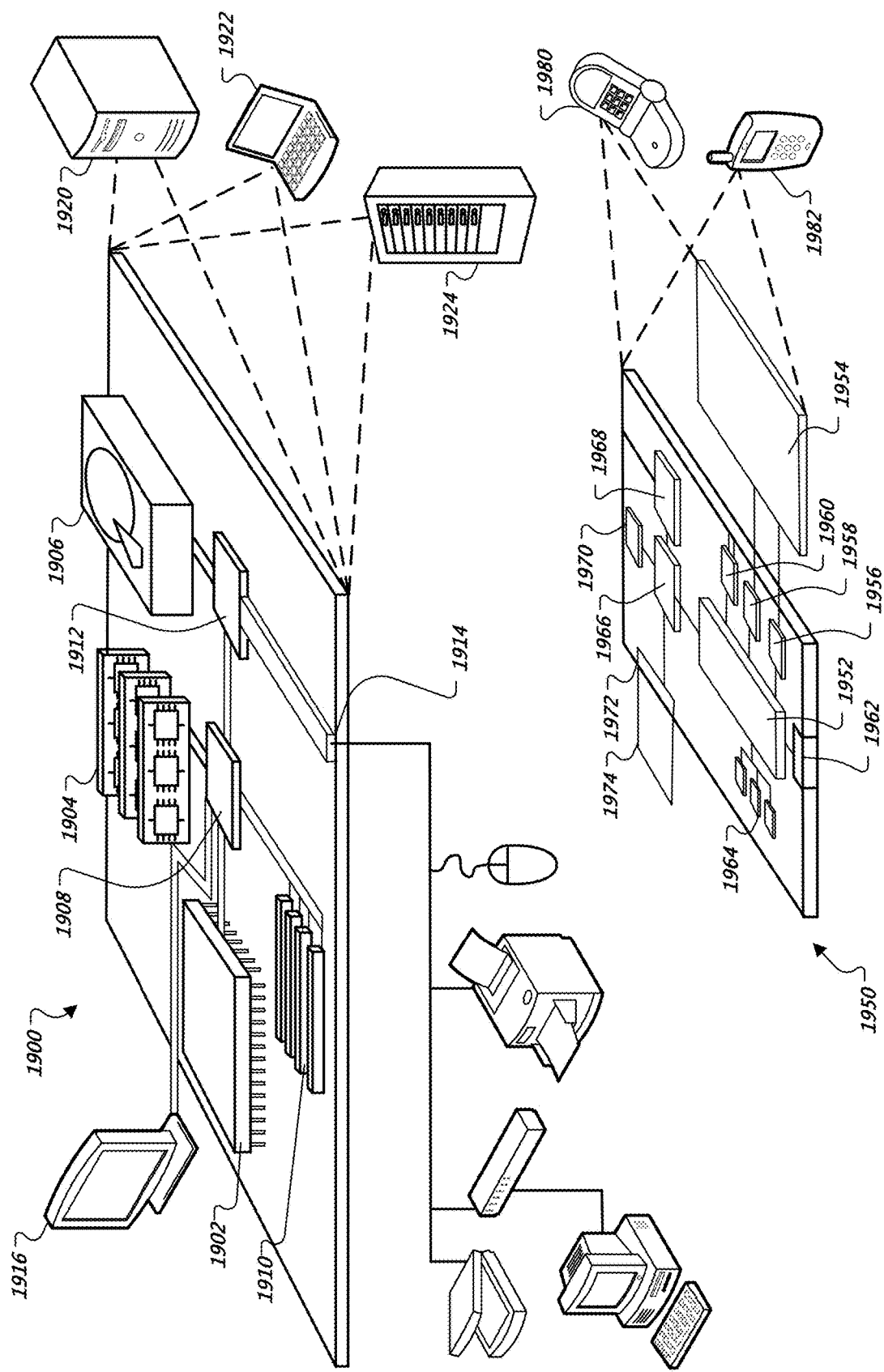
FIG. 19 is a block diagram of computing devices that may be used to implement the systems and methods described in this document, as either a client or as a server or plurality of servers.

FIG. 19 is a block diagram of computing devices 1900, 1950 that may be used to implement the systems and methods described in this document, as either a client or as a server or plurality of servers. Computing device 1900 is intended to represent various forms of digital computers, such as laptops, desktops, workstations, personal digital assistants, servers, blade servers, mainframes, and other appropriate computers. Computing device 1950 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1900 includes a processor 1902, memory 1904, a storage device 1906, a high-speed controller 1908 connecting to memory 1904 and high-speed expansion ports 1910, and a low speed controller 1912 connecting to low speed expansion port 1914 and storage device 1906. Each of the components 1902, 1904, 1906, 1908, 1910, and 1912, are interconnected using various busses, and may be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as display 1916 coupled to high-speed controller 1908. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1904 stores information within the computing device 1900. In one implementation, the memory 1904 is a volatile memory unit or units. In another implementation, the memory 1904 is a non-volatile memory unit or units. The memory 1904 may also be another form of computer-readable medium, such as a magnetic or optical disk.

The storage device 1906 is capable of providing mass storage for the computing device 1900. In one implementation, the storage device 1906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1904, the storage device 1906, or memory on processor 1902.

The high-speed controller 1908 manages bandwidth-intensive operations for the computing device 1900, while the low speed controller 1912 manages lower bandwidth-intensive operations. Such allocation of functions is an example only. In one implementation, the high-speed controller 1908 is coupled to memory 1904, display 1916 (e.g., through a graphics processor or accelerator), and to high-speed expansion ports 1910, which may accept various expansion cards (not shown). In the implementation, low-speed controller 1912 is coupled to storage device 1906 and low-speed expansion port 1914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1920, or multiple times in a group of such servers. It may also be implemented as part of a rack server system 1924. In addition, it may be implemented in a personal computer such as a laptop computer 1922. Alternatively, components from computing device 1900 may be combined with other components in a mobile device (not shown), such as device 1950. Each of such devices may contain one or more of computing device 1900, 1950, and an entire system may be made up of multiple computing devices 1900, 1950 communicating with each other.

Computing device 1950 includes a processor 1952, memory 1964, an input/output device such as a display 1954, a communication interface 1966, and a transceiver 1968, among other components. The device 1950 may also be provided with a storage device, such as a microdrive or other device, to provide additional storage. Each of the components 1950, 1952, 1964, 1954, 1966, and 1968, are interconnected using various buses, and several of the components may be mounted on a common motherboard or in other manners as appropriate.

The processor 1952 can execute instructions within the computing device 1950, including instructions stored in the memory 1964. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1950, such as control of user interfaces, applications run by device 1950, and wireless communication by device 1950.

Processor 1952 may communicate with a user through control interface 1958 and display interface 1956 coupled to a display 1954. The display 1954 may be, for example, a TFT (Thin-Film-Transistor Liquid Crystal Display) display or an OLED (Organic Light Emitting Diode) display, or other appropriate display technology. The display interface 1956 may comprise appropriate circuitry for driving the display 1954 to present graphical and other information to a user. The control interface 1958 may receive commands from a user and convert them for submission to the processor 1952. In addition, an external interface 1962 may be provide in communication with processor 1952, so as to enable near area communication of device 1950 with other devices. External interface 1962 may provided, for example, for wired communication in some implementations, or for wireless communication in other implementations, and multiple interfaces may also be used.

The memory 1964 stores information within the computing device 1950. The memory 1964 can be implemented as one or more of a computer-readable medium or media, a volatile memory unit or units, or a non-volatile memory unit or units. Expansion memory 1974 may also be provided and connected to device 1950 through expansion interface 1972, which may include, for example, a SIMM (Single In Line Memory Module) card interface. Such expansion memory 1974 may provide extra storage space for device 1950, or may also store applications or other information for device 1950. Specifically, expansion memory 1974 may include instructions to carry out or supplement the processes described above, and may include secure information also. Thus, for example, expansion memory 1974 may be provide as a security module for device 1950, and may be programmed with instructions that permit secure use of device 1950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1964, expansion memory 1974, or memory on processor 1952 that may be received, for example, over transceiver 1968 or external interface 1962.

Device 1950 may communicate wirelessly through communication interface 1966, which may include digital signal processing circuitry where necessary. Communication interface 1966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1968. In addition, short-range communication may occur, such as using a Bluetooth, WiFi, or other such transceiver (not shown). In addition, GPS (Global Positioning System) receiver module 1970 may provide additional navigation- and location-related wireless data to device 1950, which may be used as appropriate by applications running on device 1950.

Device 1950 may also communicate audibly using audio codec 1960, which may receive spoken information from a user and convert it to usable digital information. Audio codec 1960 may likewise generate audible sound for a user, such as through a speaker, e.g., in a handset of device 1950. Such sound may include sound from voice telephone calls, may include recorded sound (e.g., voice messages, music files, etc.) and may also include sound generated by applications operating on device 1950.

The computing device 1950 may be implemented in a number of different forms, as shown in the figure. For example, it may be implemented as a cellular telephone 1980. It may also be implemented as part of a smartphone 1982, personal digital assistant, or other similar mobile device.

Additionally computing device 1900 or 1950 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, by a computing device through user interaction with a graphical workflow for creating a new messaging campaign, first user input that specifies criteria for a first messaging campaign to select a first recurring group of contact records for distribution to a particular user account during each recurring period of time, with the first user input specifying that the first recurring group of contact records is to be formed of:
 (i) a user-selected first amount of contact records;
 (ii) a user-selected first type of contact record from among a plurality of types of contact records; and
 (iii) contact records that designate user-selected first geographic areas from among a plurality of geographic areas;
receiving, by the computing device through user interaction with the graphical workflow for creating the new messaging campaign, second user input that specifies criteria for a second messaging campaign to select a second recurring group of contact records for distribution to same said particular user account each recurring period of time, with the second user input specifying that the second recurring group of contact records is to be formed of:
 (i) a user-selected second amount of contact records, the second amount of contact records different from the first amount of contact records;
 (ii) a user-selected second type of contact record from among the plurality of types of contact records, the second type of contact record different from the first type of contact record;
 (iii) contact records that designate user-selected second geographic areas from among the plurality of geographic areas, the second geographic areas different from the first geographic areas;
presenting, by the computing device, a single user interface screen that displays information for multiple messaging campaigns and enables user modification to the multiple messaging campaigns, the single user interface screen displaying:
 (i) a first graphical portion that presents the criteria for the first messaging campaign, including that the first recurring group of contact records distributed to the particular user account each recurring period of time are to be formed of the first amount of contact records, the first type of contact records, and contact records that designate the first geographic areas;
 (ii) a second graphical portion that presents the criteria for the second messaging campaign, including that the second recurring group of contact records distributed to the particular user account each recurring period of time are to be formed of the second amount of contact records, the second type of contact records, and contact records that designate the second geographic areas; and
 (iii) selectable interface elements that enable user input to activate and deactivate individual campaigns of the multiple messaging campaigns;
receiving, by a device that is logged into the particular user account, each recurring period of time for display by the device:
 (i) a first set of contact records that satisfies the criteria for the first messaging campaign, including being formed of: the first amount of contact records, the first type of contact records, and contact records that designate the first geographic areas; and
 (ii) a second set of contact records that satisfies the criteria for the second messaging campaign, including being formed of: the second amount of contact records, the second type of contact records, and contact records that designate the second geographic areas.

2. The computer-implemented method of claim 1, wherein the first user input at the computing device specifies that the first recurring group of contact records is to be formed of the user-selected first type of contact record from among the plurality of types of contact records by selecting the user-selected first type of contact record from a pull-down menu that presents the plurality of types of contact records.

3. The computer-implemented method of claim 1, wherein the first user input at the computing device specifies that the first recurring group of contact records is to be formed of the user-selected first geographic areas from among the plurality of geographic areas by interacting with a map presented by the computing device to select the user-selected first geographic areas.

4. The computer-implemented method of claim 1, wherein the first user input specifies that the first recurring group of contact records is to be distributed to the particular user account by user input that selects the particular user account from among a plurality of user accounts available for selection at the remote-computing device.

5. The computer-implemented method of claim 1, wherein:
the user-selected first geographic areas include a first user-selected geographic area and a second user-selected geographic area; and
the first set of contact records that is received by the device that is logged into the particular user account each recurring period of time for presentation by the device includes:

(i) a first portion of contact records, from the first set of contact records, that designate the first user-selected geographic area, and
(ii) a second portion of contact records, from the first set of contact records, that designate the second user-selected geographic area.

6. The computer-implemented method of claim 1, wherein the recurring period of time is a week of time.

7. The computer-implemented method of claim 1, wherein:
a computing system selects a first instance of the first set of contact records for distribution to the device that is logged into the particular user account during a first instance of the recurring period of time; and
the computing system selects a second instance of the first set of contact records for distribution to the device that is logged into the particular user account during a second instance of the recurring period of time.

8. The computer-implemented method of claim 7, wherein the computing system selects the first instance of the first set of contact records and selects the second instance of the second set of contact records without receipt of user input that re-specifies (i) the user-selected first amount of contact records, (ii) the user-selected first type of contact record, and (iii) the user-selected first geographic areas.

9. The computer-implemented method of claim 1, wherein the device at which the particular user account logged in and that receives the first set of contact records and the second set of contact records for display is the computing device at which the first user input specified the criteria for the first messaging campaign.

10. The computer-implemented method of claim 1, wherein:
the first user input specifies that the first recurring group of contact records is to be:
(i) distributed to the particular user account daily instead of in bulk each recurring period of time; and
(ii) distributed to the particular user account with a user-selected maximum daily amount of contact records distributed each day during the recurring period of time; and
the user-selected first amount of contact records is greater than the user-selected maximum daily amount of contact records.

11. One or more non-transitory computer-readable devices including instructions stored thereon that, when executed by one or more processors of a computing device, cause the computing device to perform operations that include:
receiving, by the computing device through user interaction with a graphical workflow for creating a new messaging campaign, first user input that specifies criteria for a first messaging campaign to select a first recurring group of contact records for distribution to a particular user account during each recurring period of time, with the first user input specifying that the first recurring group of contact records is to be formed of:
(i) a user-selected first amount of contact records;
(ii) a user-selected first type of contact record from among a plurality of types of contact records; and
(iii) contact records that designate user-selected first geographic areas from among a plurality of geographic areas;
receiving, by the computing device through user interaction with the graphical workflow for creating the new messaging campaign, second user input that specifies criteria for a second messaging campaign to select a second recurring group of contact records for distribution to same said particular user account each recurring period of time, with the second user input specifying that the second recurring group of contact records is to be formed of:
(i) a user-selected second amount of contact records, the second amount of contact records different from the first amount of contact records;
(ii) a user-selected second type of contact record from among the plurality of types of contact records, the second type of contact record different from the first type of contact record;
(iii) contact records that designate user-selected second geographic areas from among the plurality of geographic areas, the second geographic areas different from the first geographic areas;
presenting, by the computing device, a single user interface screen that displays information for multiple messaging campaigns and enables user modification to the multiple messaging campaigns, the single user interface screen displaying:
(i) a first graphical portion that presents the criteria for the first messaging campaign, including that the first recurring group of contact records distributed to the particular user account each recurring period of time are to be formed of the first amount of contact records, the first type of contact records, and contact records that designate the first geographic areas;
(ii) a second graphical portion that presents the criteria for the second messaging campaign, including that the second recurring group of contact records distributed to the particular user account each recurring period of time are to be formed of the second amount of contact records, the second type of contact records, and contact records that designate the second geographic areas; and
(iii) selectable interface elements that enable user input to activate and deactivate individual campaigns of the multiple messaging campaigns;
receiving, by a device that is logged into the particular user account, each recurring period of time for display by the device:
(i) a first set of contact records that satisfies the criteria for the first messaging campaign, including being formed of the first amount of contact records, the first type of contact records, and contact records that designate the first geographic areas; and
(ii) a second set of contact records that satisfies the criteria for the second messaging campaign, including being formed of the second amount of contact records, the second type of contact records, and contact records that designate the second geographic areas.

12. The one or more non-transitory computer-readable devices of claim 11, wherein the first user input at the computing device specifies that the first recurring group of contact records is to be formed of the user-selected first type of contact record from among the plurality of types of contact records by selecting the user-selected first type of contact record from a pull-down menu that presents the plurality of types of contact records.

13. The one or more non-transitory computer-readable devices of claim 11, wherein the first user input at the computing device specifies that the first recurring group of contact records is to be formed of the user-selected first geographic areas from among the plurality of geographic areas by interacting with a map presented by the computing device to select the user-selected first geographic areas.

14. The one or more non-transitory computer-readable devices of claim 11, wherein the first user input specifies that the first recurring group of contact records is to be distributed to the particular user account by user input that selects the particular user account from among a plurality of user accounts available for selection at the computing device.

15. The one or more non-transitory computer-readable devices of claim 11, wherein:
 the user-selected first geographic areas include a first user-selected geographic area and a second user-selected geographic area; and
 the first set of contact records that is received by the device that is logged into the particular user account each recurring period of time for presentation by the device includes:
  (i) a first portion of contact records, from the first set of contact records, that designate the first user-selected geographic area, and
  (ii) a second portion of contact records, from the first set of contact records, that designate the second user-selected geographic area.

16. The one or more non-transitory computer-readable devices of claim 11, wherein the recurring period of time is a week of time.

17. The one or more non-transitory computer-readable devices of claim 11, wherein:
 a computing system selects a first instance of the first set of contact records for distribution to the device that is logged into the particular user account during a first instance of the recurring period of time; and
 the computing system selects a second instance of the first set of contact records for distribution to the device that is logged into the particular user account during a second instance of the recurring period of time.

18. The one or more non-transitory computer-readable devices of claim 17, wherein the computing system selects the first instance of the first set of contact records and selects the second instance of the second set of contact records without receipt of user input that re-specifies (i) the user-selected first amount of contact records, (ii) the user-selected first type of contact record, and (iii) the user-selected first geographic areas.

19. The one or more non-transitory computer-readable devices of claim 11, wherein the device at which the particular user account logged in and that receives the first set of contact records and the second set of contact records for display is the computing device at which the first user input specified the criteria for the first messaging campaign.

20. The one or more non-transitory computer-readable devices of claim 11, wherein:
 the first user input specifies that the first recurring group of contact records is to be:
  (i) distributed to the particular user account daily instead of in bulk each recurring period of time; and
  (ii) distributed to the particular user account with a user-selected maximum daily amount of contact records distributed each day during the recurring period of time; and
 the user-selected first amount of contact records is greater than the user-selected maximum daily amount of contact records.

* * * * *